United States Patent
Huang et al.

(10) Patent No.: US 10,257,833 B2
(45) Date of Patent: Apr. 9, 2019

(54) BANDWIDTH AVAILABILITY TRIGGER FRAMES

(71) Applicant: Intel IP Corporation, Santa Clara, CA (US)

(72) Inventors: Po-Kai Huang, San Jose, CA (US);
Qinghua Li, San Ramon, CA (US);
Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/967,794

(22) Filed: May 1, 2018

(65) Prior Publication Data
US 2018/0310310 A1    Oct. 25, 2018

Related U.S. Application Data

(63) Continuation of application No. 14/849,069, filed on Sep. 9, 2015, now Pat. No. 9,986,566.
(Continued)

(51) Int. Cl.
*H04W 72/04* (2009.01)
*H04W 74/08* (2009.01)
(Continued)

(52) U.S. Cl.
CPC ....... *H04W 72/0453* (2013.01); *H04L 5/0071* (2013.01); *H04L 5/0094* (2013.01);
(Continued)

(58) Field of Classification Search
CPC ......... H04W 72/0453; H04W 74/0816; H04W 74/006; H04W 84/20; H04W 84/12;
(Continued)

(56) References Cited

U.S. PATENT DOCUMENTS 9,986,566 B2    5/2018   Huang et al.
2011/0150004 A1    6/2011   Denteneer et al.
(Continued)

FOREIGN PATENT DOCUMENTS

CN    107409033 A    11/2017
WO    WO-2016171796 A1    10/2016

OTHER PUBLICATIONS

"U.S. Appl. No. 14/849,069, Examiner Interview Summary dated Jan. 5, 2018", 3 pgs.
(Continued)

*Primary Examiner* — Omar J Ghowrwal
(74) *Attorney, Agent, or Firm* — Schwegman Lundberg & Woessner, P.A.

(57) ABSTRACT

Methods, apparatuses, and computer readable media for MU-RTS and CTS are disclosed. An apparatus of a high-efficiency wireless local-area network (HEW) master station is disclosed. The HEW master station including processing circuitry configured to generate a packet to indicate a multi-user request-to-send (MU-RTS) and to indicate channels on which one or more HEW stations are to transmit a clear-to-send (CTS). The HEW master station further including a transceiver configured to transmit the packet to the one or more HEW stations, and receive clear-to-send responses to the packet on the one or more channels. An apparatus of a HEW station is also disclosed. The HEW station including circuitry configured to receive a packet that indicates a MU-RTS that indicates channels on which the HEW station is to transmit a CTS, and to determine whether to send the CTS.

25 Claims, 16 Drawing Sheets

Related U.S. Application Data

(60) Provisional application No. 62/152,110, filed on Apr. 24, 2015.

(51) Int. Cl.
  | | |
  |---|---|
  | *H04L 5/00* | (2006.01) |
  | *H04W 74/00* | (2009.01) |
  | *H04W 84/20* | (2009.01) |
  | *H04W 84/12* | (2009.01) |

(52) U.S. Cl.
   CPC ......... *H04W 74/0816* (2013.01); *H04L 5/001* (2013.01); *H04L 5/0039* (2013.01); *H04W 74/006* (2013.01); *H04W 84/12* (2013.01); *H04W 84/20* (2013.01)

(58) Field of Classification Search
   CPC ..... H04L 5/0071; H04L 5/0094; H04L 5/001; H04L 5/0039
   See application file for complete search history.

(56) References Cited

U.S. PATENT DOCUMENTS

| | | |
|---|---|---|
| 2011/0194644 A1 | 8/2011 | Liu et al. |
| 2012/0087358 A1 | 4/2012 | Zhu et al. |
| 2014/0010145 A1 | 1/2014 | Liu et al. |
| 2014/0029543 A1 | 1/2014 | Fischer et al. |
| 2014/0328268 A1 | 11/2014 | Zhu et al. |
| 2015/0063189 A1 | 3/2015 | Merlin et al. |
| 2015/0188675 A1 | 7/2015 | Abeysekera et al. |
| 2016/0315738 A1 | 10/2016 | Huang et al. |

OTHER PUBLICATIONS

"U.S. Appl. No. 14/849,069, Final Office Action dated Oct. 13, 2017", 22 pgs.
"U.S. Appl. No. 14/849,069, Non Final Office Action dated Jun. 26, 2017", 26 pgs.
"U.S. Appl. No. 14/849,069, Notice of Allowability dated Mar. 15, 2018", 2 pgs.
"U.S. Appl. No. 14/849,069, Notice of Allowance dated Nov. 25, 2018", 9 pgs.
"U.S. Appl. No. 14/849,069, Respnse filed Jan. 2, 2018 to Final Office Action dated Oct. 13, 2017", 11 pgs.
"U.S. Appl. No. 14/849,069, Response filed Sep. 26, 2017 to Non Final Office Action dated Jun. 26, 2017", 12 pgs.
"Chinese Application Serial No. 201680016708.3, Voluntary Amendment filed Jul. 11, 2018", W/ English Claims, 13 pgs.
"European Application Serial No. 16783539.6, Response filed Jun. 7, 2018 to Communication pursuant to Rules161(2) and 162 EPC dated Dec. 1, 2017", 5 pgs.
"International Application Serial No. PCT/US2016/020366, International Preliminary Report on Patentability dated Nov. 2, 2017", 10 pgs.
"International Application Serial No. PCT/US2016/020366, International Search Report dated Jun. 29, 2016", 3 pgs.
"International Application Serial No. PCT/US2016/020366, Written Opinion dated Jun. 29, 2016", 9 pgs.
"Japanese Application Serial No. 2017-544002, Voluntary Amendment filed Jul. 18, 2018", W/ English Claims, 10 pgs.
"Korean Application Serial No. 10-2017-7026645, Voluntary Amendment filed Jul. 16, 2018", W/ English Claims, 25 pgs.
"Wireless LANs", IEEEP802.11, (Sep. 2015), 1-22.
"European Application Serial No. 16783539.6, Invitation pursuant to Rule 63(1) EPC dated Oct. 17, 2018", 3 pgs.

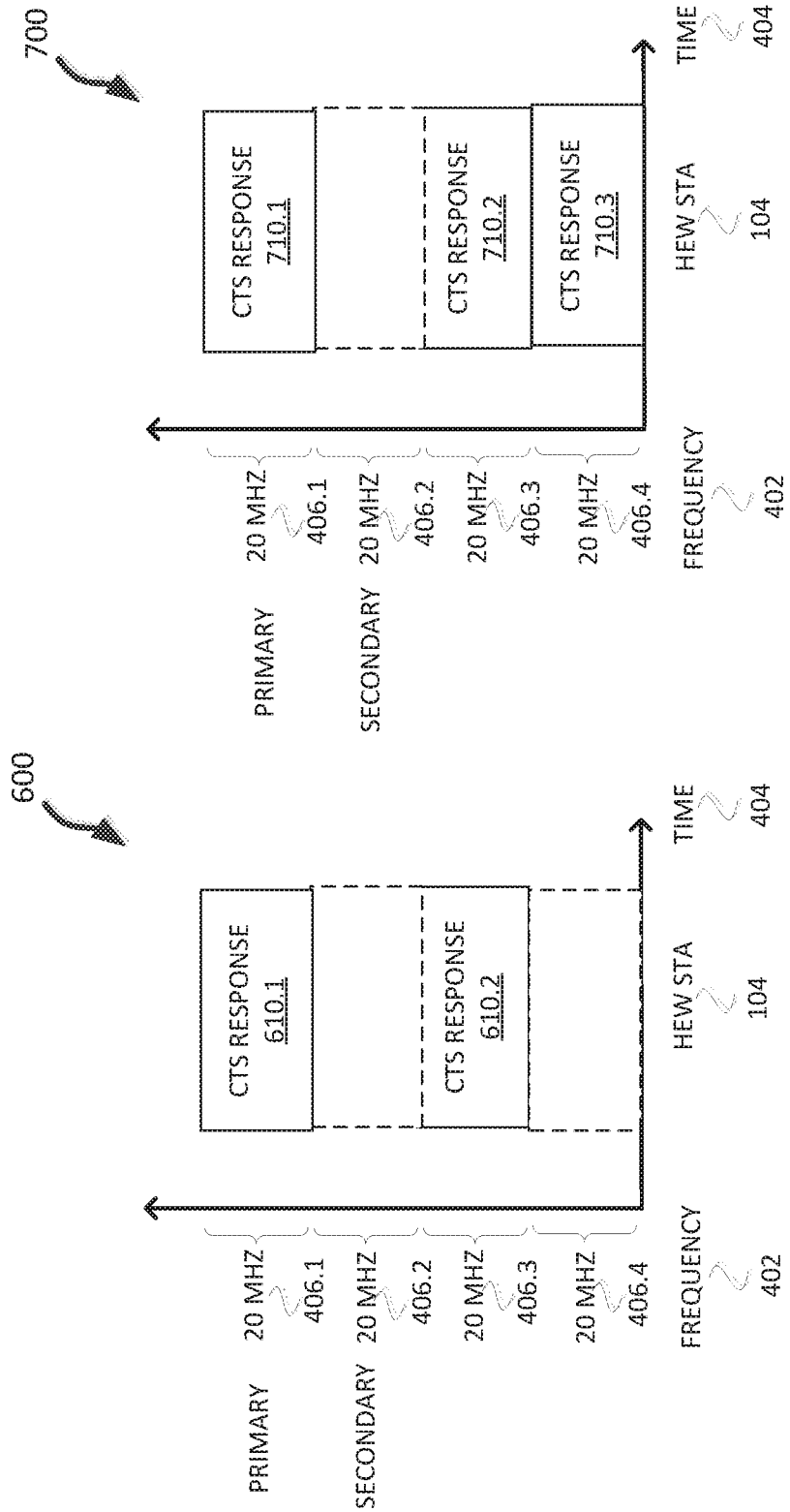

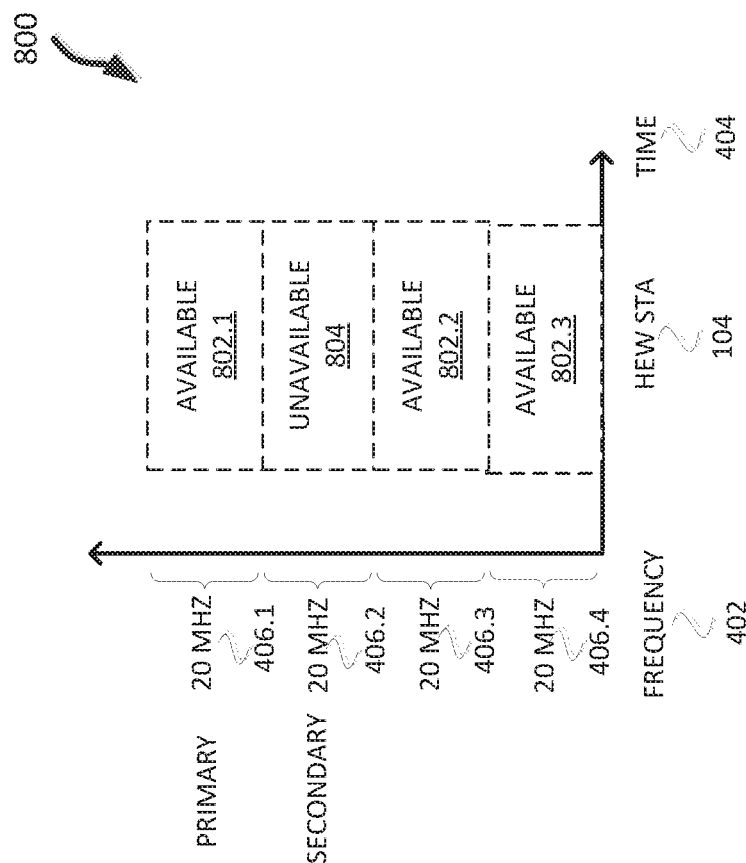

BANDWIDTH AVAILABILITY TRIGGER FRAMES

PRIORITY CLAIM

This application is a continuation of U.S. patent application Ser. No. 14/849,069, filed Sep. 9, 2015, which claims the benefit of priority under 35 USC 119(e) to U.S. Provisional Patent Application Ser. No. 62/152,110, filed Apr. 24, 2015, each of which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to multi-user request-to-send (MU-RTS) and clear-to-send (CTS). Some embodiments relate to MU-RTS with availability reports. Some embodiments relate to real-locating downlink resources based on a bandwidth availability report prior to a trigger frame. Some embodiments relate to bandwidth indication frames and/or bandwidth availability triggers.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, it may be difficult for wireless devices to be aware of resources available to other wireless devices. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIGS. 4-7 illustrate methods of transmitting CTS responses in accordance with some embodiments;

FIG. 8 illustrates a method of transmitting CTS responses in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
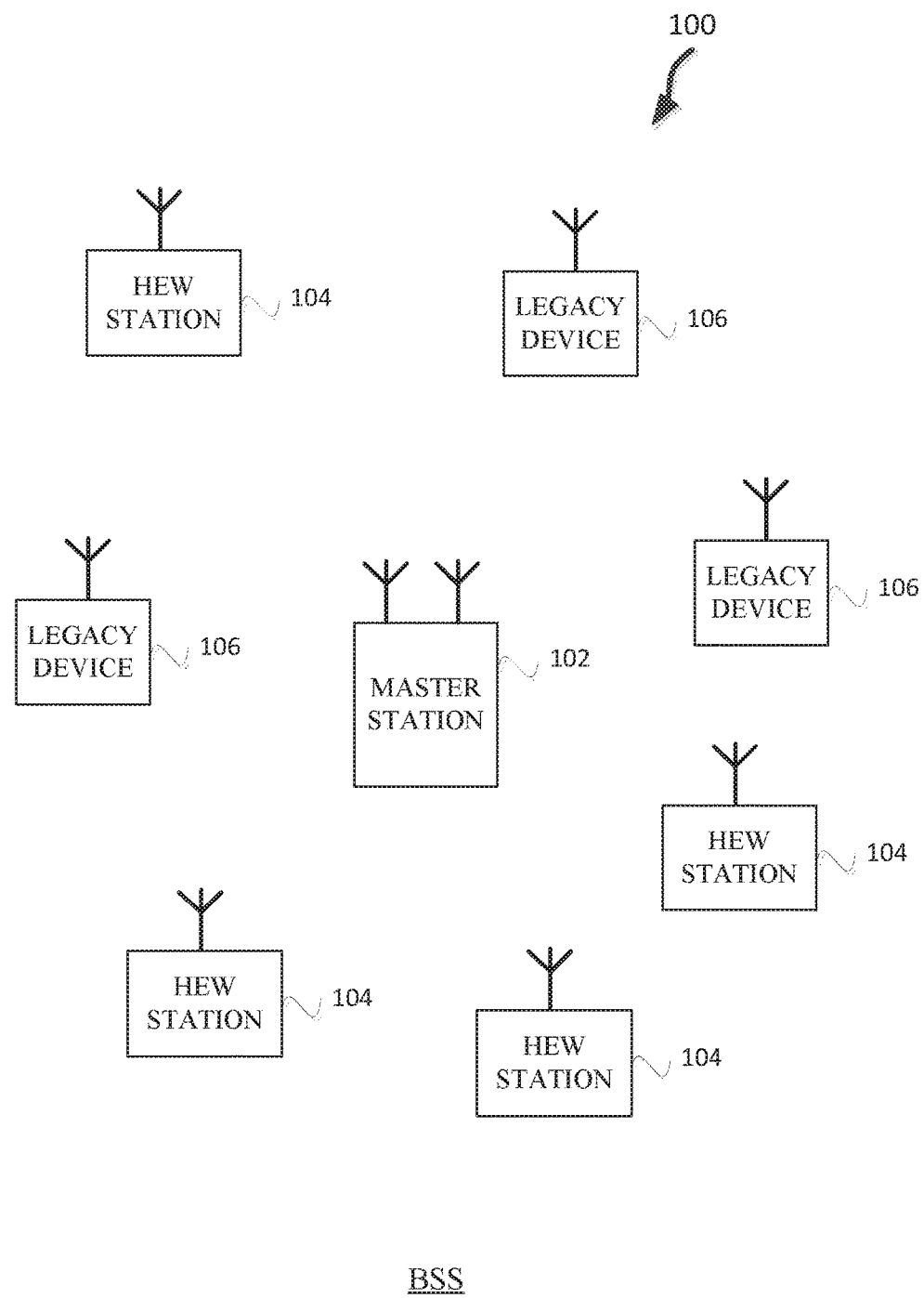
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/g/ag/n/ac, or another legacy wireless communication standard. The legacy devices 106 may be STAs or IEEE STAs.

The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEE 802.11 communication technique prior to IEEE 802.11ax.

In some embodiments, a HEW frame may be configurable to have the same bandwidth as a sub-channel. In some embodiments a sub-channel may have a bandwidth of one of the following: 20 MHz, 40 MHz, or 80 MHz, 160 MHz, 320 MHz contiguous bandwidths or an 80+80 MHz (160 MHz) non-contiguous bandwidth. In some embodiments, a sub-channel may have a bandwidth of 1 MHz, 1.25 MHz, 2.0 MHz, 2.02 MHz, 2.5 MHz, 5 MHz and 10 MHz, or a combination thereof or another bandwidth that is less or equal to the available bandwidth, may also be used.

In some embodiments the bandwidth of the subchannels are multiples of 26 (e.g., 26, 52, 104, etc.) tones that are spaced by 20 MHz or 256 tones sub-channels. In some embodiments the sub-channels are multiple of 26 tones or a multiple of 20 MHz. In some embodiments a 20 MHz sub-channel may comprise 256 tones for a 256 point Fast Fourier Transform (FFT). A HEW frame may be configured for transmitting a number of spatial streams, which may be in accordance with MU-MIMO.

In some embodiments a basic allocation or resource unit may be 26 or 242 subcarriers and the channels and sub-channels may be comprised of a number of the basic resource units. In some embodiments the basic allocation or resource unit may be a different number of subcarriers such as 24 to 256. In some embodiments there may be one or more left over subcarriers in a channel or sub-channel in addition to a number of the basic resource units.

In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., WirelessMAN or Worldwide Interoperability for Microwave Access (WiMAX®)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a TDMA technique or a frequency division multiple access (FDMA) technique. In some embodiments, the multiple access technique may be a SDMA technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-18.

Figure 2:
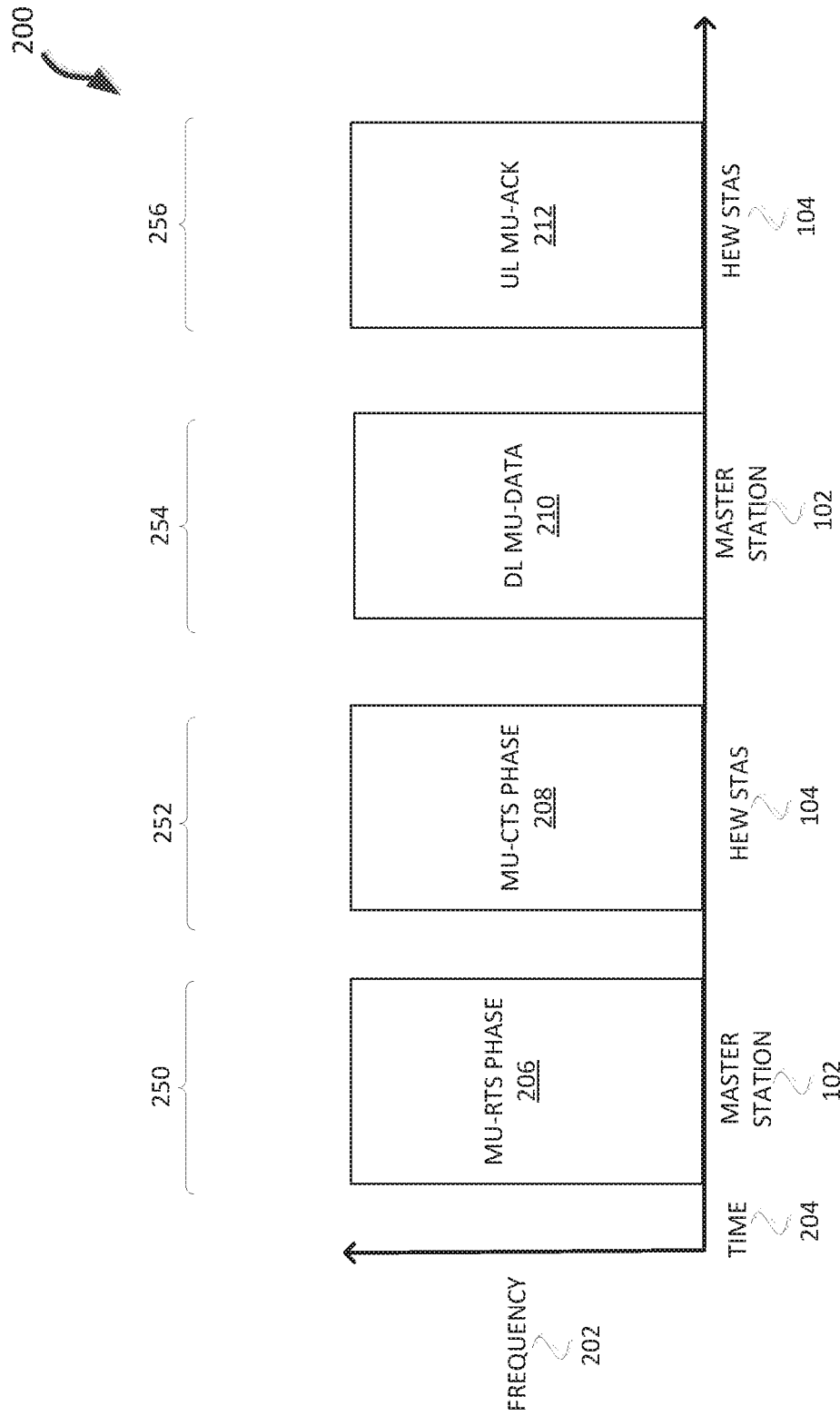
FIG. 2 illustrates a method of MU-RTS and MU-CTS in accordance with some embodiments.

FIG. 2 illustrates a method 200 of MU-RTS and MU-CTS in accordance with some embodiments. Illustrated in FIG. 2 is time 204 along a horizontal axis and frequency 202 along a vertical axis. The method 200 may begin at operation 250 with the master station 102 transmitting in a MU-RTS phase 206. The master station 102 may transmit to one or more FLEW STAs 104 an indication of a request to transmit a CTS packet. The method 200 may continue at operation 252 with the HEW STAs 104 transmitting in a MU-CTS phase 208. The MU-CTS phase 208 comprises one or more HEW STAs 104 transmitting a MU-CTS. The method 200 may continue at operation 254 with downlink (DL) MU-DATA 210 being transmitted by the master station 102 to one or more HEW STAs 104. The one or more HEW STAs 104 that receive DL MU-DATA 210 may be a different set of HEW STAB 104 than the HEW STAs 104 that transmitted MU-CTSs in the MU-CTS phase 208. The one or more HEW STAs 104 that receive DL MU-DATA 210 may be a different set of HEW STAs 104 than the HEW STAs 104 that were addressed in the MU-RTS phase 206 transmitted by the master station 102.

The method 200 may continue at operation 256 with the one or more HEW STAs transmitting uplink multi-user acknowledgements (UL MU-ACKs) 212 to the master station 102. The method 200 may end. In some embodiments one or more operations may be repeated.

Figure 3:
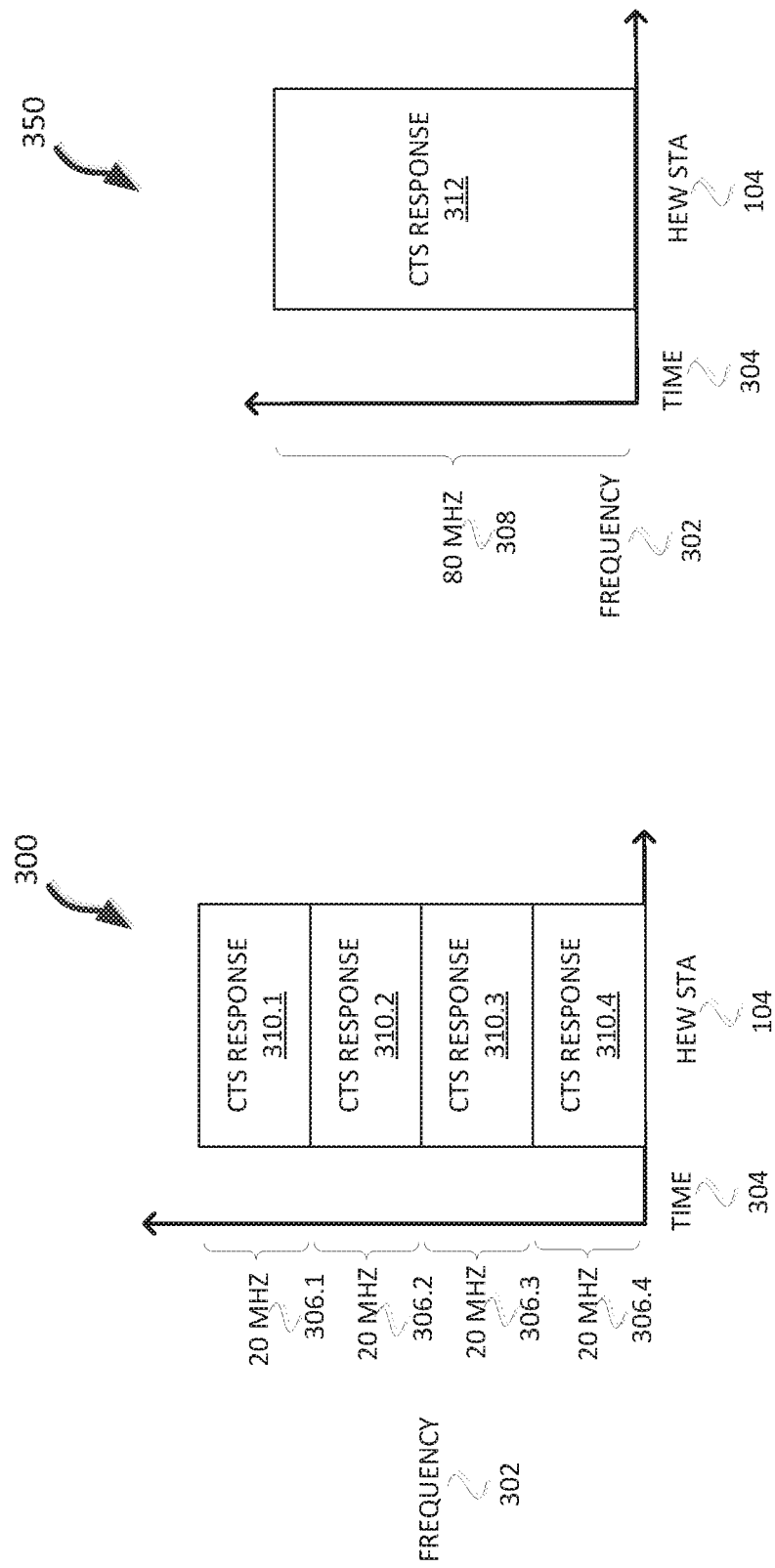
FIG. 3 illustrates methods of transmitting CTS responses in accordance with some embodiments.
Figures 4, 5:
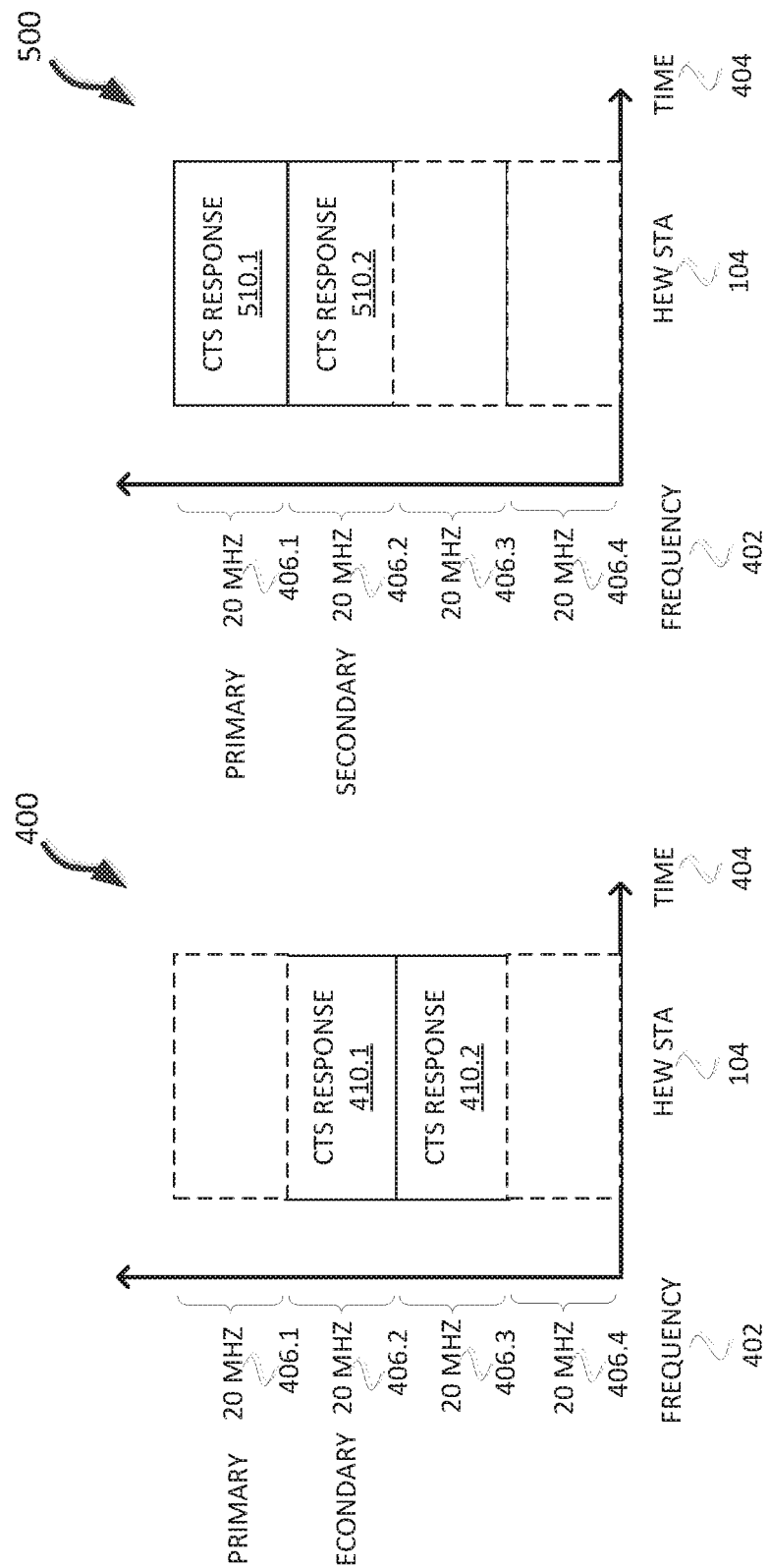

FIG. 3 illustrates methods of transmitting CTS responses in accordance with some embodiments. Illustrated in FIG. 3 is time 304 along a horizontal axis and frequency 302 along a vertical axis. The method 300 illustrates a HEW STA 104 transmitting a CTS response 310 on multiple 20 MHz channels 306. The CTS response 310 may be duplicated so that the CTS response 310.1 is the same as the CTS response 310.2 but transmitted on a different 20 MHz channel 306. The method 350 illustrates a HEW STA 104 transmitting a CTS response 312 on four contiguous 20 MHz channels to form a 80 MHz channel 308. In some embodiments a different bandwidth may be used for the 20 MHz channels 310 and/or 80 MHz channel 308. In some embodiments, the HEW STA 104 may be configured to transmit CTS responses 310 that are different for the different 20 MHz channels 306. In some embodiments one of the 20 MHz channels 306 may be a primary channel. For example, 20 MHz channel 306.1 may be a primary channel.

In some embodiments, a HEW STA 104 and/or master station 102 may not be able to transmit CTS responses 310 on non-contiguous 20 MHz channel 306. For example, a HEW STA 104 may be limited in not being able to transmit on 20 MHz channel 306.1 and 20 MHz channel 306.3 simultaneously without also transmitting on 20 MHz channel 306.2.

FIGS. 4-7 illustrate methods of transmitting CTS responses in accordance with some embodiments. Illustrated in FIGS. 4-7 is time 404 along a horizontal axis and frequency 402 along a vertical axis. The frequency 402 may comprise different channels. For example, as illustrated, the frequency 402 comprises four 20 MHz channels 406. Different bandwidths may be used and a different number of channels may be used. One 20 MHz channel 406 may be a primary channel, which, as illustrated, is 20 MHz channel 406.1. One 20 MHz channel 406 may be a secondary channel, which, as illustrated, is 20 MHz channel 406.2.

The HEW STA 104 transmits CTS responses 410, 510, 610, 710. As illustrated the CTS responses 410, 510, 610, 710 may be the same, but in some embodiments the CTS responses 410, 510, 610, 710 may be different for one or more of the channels.

FIG. 8 will be disclosed in conjunction with FIGS. 4-7. FIG. 8 illustrates a method of transmitting CTS responses in accordance with some embodiments. Illustrated in FIG. 8 is time 404 along a horizontal axis and frequency 402 along a vertical axis. A HEW STA 104 may perform observations of 20 MHz channels 406. The observation may include, for example, a clear channel assessment, a busy condition, and/or a NAV condition of the 20 MHz channel 406, Observations may determine that a 2.0 MHz channel 406 is unavailable, available, or in some embodiment indeterminate. For example, as illustrated, 20 MHz channels 406.1, 406.3, and 406.4 are available 802.1, 802.2, and 802.3, respectively. 20 MHz channel 406.2 is unavailable 804. For example, the HEW STA 104 may determine that channel 406.2 has a NAV set to indicate not to transmit on 20 MHz channel 406.2, or the HEW STA 104 may perform a clear channel assessment and determine that the 20 MHz channel 406.2 is not clear.

In some embodiments, the HEW STA 104 does not know which 20 MHz channel 406 the master station 102 is going to transmit packets to the HEW STA 104. The HEW STA 104 may be responding to a RTS or MU-RTS. The HEW STA 104 may periodically or in response to a RTS, MU-RTS, trigger frame, or another packet, attempt to observe the 20 MHz channels 406.

In some embodiments the HEW STA 104 may transmit CTS responses 410, 510, 610, 710 only on 20 MHz channels 406 that determined to be available based on an observation of the channel. In some embodiments the HEW STA 104 may attempt to transmit CTS responses 410, 510, 610, 710 only on as many 20 MHz channels 406 that the HEW STA 104 can based on observations and based on constraints of the HEW STA 104, e.g. that the HEW STA 104 may only be able to transmit on contiguous 20 MHz channels 406.

In some embodiments, the HEW STA 104 may be limited to only transmit on contiguous 20 MHz channels 406. The HEW STA 104 may choose to transmit CTS responses 410, 510, 610, 710 on the largest contiguous bandwidth. For example, in FIG. 4, the HEW STA 104 may choose to transmit on 20 MHz channels 406.2 and 406.3, with CTS response 410.1 and 410.2, respectively.

In some embodiments, the HEW STA 104 may be configured to transmit on the primary 20 MHz channel 406.1, and may transmit on the largest number of contiguous 20 MHz channels 406 that include the primary 20 MHz channel 406.1. For example, in FIG. 5, the HEW STA 104 may transmit a CTS response 510.1 and 510.2, on the primary 20 MHz channel 406.1 and a second 20 MHz channel 406.2, respectively. The HEW STA 104 may not have transmitted on 20 MHz channel 406.3 because it may have been unavailable. The HEW STA 104 may not have transmitted on 20 MHz channel 406.4 because it was not contiguous with an available 20 MHz channel 406.

In FIG. 6, the HEW STA 104 transmits CTS response 610.1 and 610.2 to include the primary 20 MHz channel 406. In FIG. 6, the HEW STA 104 is not constrained to only transmit on contiguous 20 MHz channel 406.

In FIG. 7, the HEW STA 104 is not constrained to only transmit CTS responses 710 on contiguous 20 MHz channels 406. The HEW STA 104 may transmit CTS responses 710.1, 710.2, and 710.3 on 20 MHz channels 406.1, 406.3, and 406.4, respectively. The HEW STA 104 may not transmit on 20 MHz channel 406.2 because the observation may determine that the 20 MHz channel 406.2 is unavailable.

In some embodiments, the HEW STA 104 may transmit CTS responses 410, 510, 610, 710 on 20 MHz channels 406 where a CTS responses 410, 510, 610, 710 is not needed (e.g., the master station 102 may not transmit data on the 20 MHz channel 406), or the HEW STA 104 may not transmit a CTS response 410, 510, 610, 710 on a 20 MHz channel 406 that needs a CTS responses 410, 510, 610, 710 (e.g., the 20 MHz channel 406 may be observed as unavailable or the HEW STA 102 may be constrained to only transmit on contiguous 20 MHz channels 406 and not have selected a 20 MHz channel 406 the master station 102 is going to use to send data to the HEW STA 104).

Figure 9:
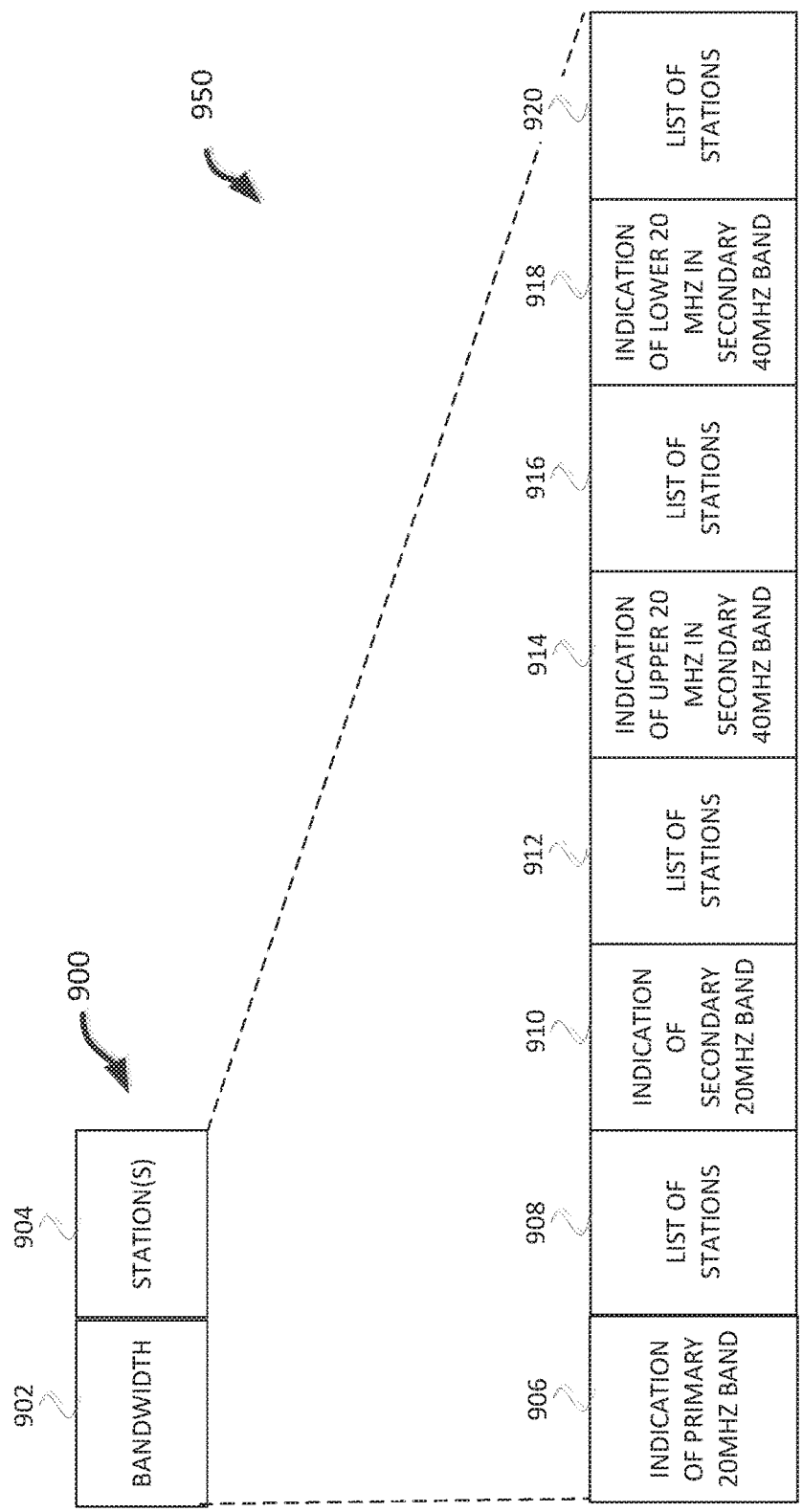
FIG. 9 illustrates bandwidth indication signaling in accordance with some embodiments.

FIG. 9 illustrates bandwidth indication signaling 900, 950 in accordance with some embodiments. The bandwidth indication signaling 900 may include a bandwidth 902 and a station(s) 904. The bandwidth 902 may be an indication of a bandwidth and station(s) 904 may be an indication of one or more HEW stations 104. The bandwidth indication signaling 900, 950 may be included in a packet from the master station 102 to one or more HEW STAs 104 to indicate the bandwidth the master station 102 intends to transmit on.

Bandwidth indication signaling 950 is an example of bandwidth indication signaling 900 for an 80 MHz bandwidth. Indication of primary 20 MHz band 906 may be an indication of whether the primary 20 MHz band will be used. The list of stations 908, 912, 916, 920, may be an indication of which stations should transmit a CTS on the corresponding band 906, 910, 914, 918 if the band indicates the band will be used. The list of stations 908, 912, 916, 920 may be an indication of which stations the master station 102 intends to transmit data to on the corresponding indication of the band 906, 910, 914, 918.

Similarly, indication of secondary 20 MHz band 910, indication of upper 20 MHz in secondary 40 MHz band, indication of lower 20 MHz in secondary 40 MHz band, may be an indication of whether the secondary 20 MHz band, upper 20 MHz in secondary 40 MHz band, and of lower 20 MHz in secondary 40 MHz band, respectively, will be used.

Figure 10:
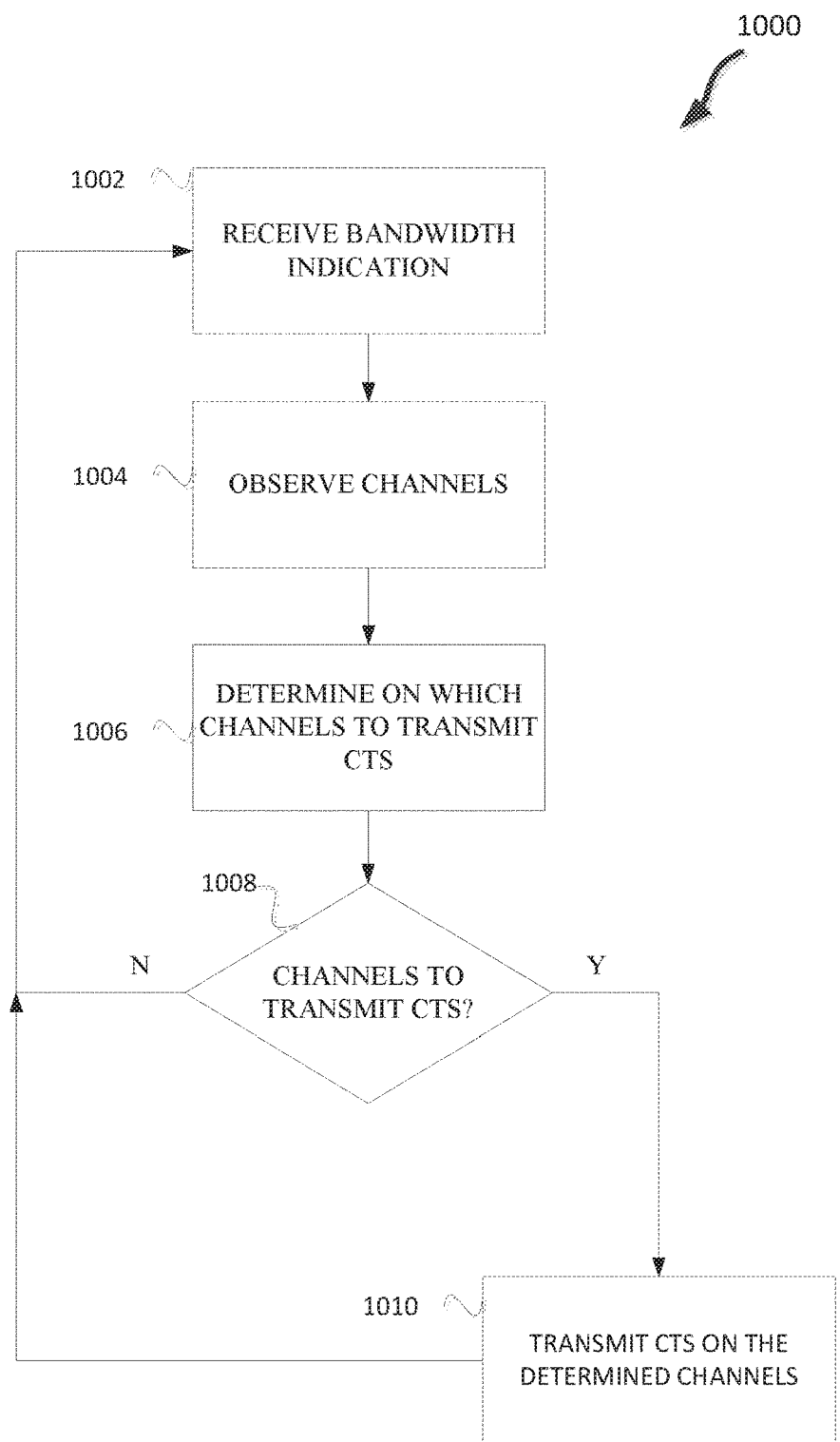
FIG. 10 illustrates of a method of transmitting CTSs in accordance with some embodiments.

FIG. 10 illustrates of a method 1000 of transmitting CTSs in accordance with some embodiments. The method 1000 may optionally begin at operation 1002 with receiving bandwidth indication. For example, a HEW STA 104 and/or master station 102 may receive bandwidth indication signaling 900, 950.

The method 1000 may optionally continue at operation 1004 with observing channels. For example, the HEW STA 104 may perform observations as disclosed in conjunction with FIG. 8.

The method 1000 may continue at operation 1006 with determining on which channels to transmit CTSs. For example, the HEW STA 104 may determine whether to transmit on a channel based on the observations. The HEW STA 104 could transmit CTSs only on channels that are observed to be available. In some embodiments, the HEW STA 104 may only transmit on channels indicated in the bandwidth indication signaling. In some embodiments, the HEW STA 104 may only transmit on channels indicated in the bandwidth indication signaling and channels that are observed as available. In some embodiments, the HEW STA 104 may only transmit CTSs on contiguous channels. In some embodiments, the HEW STA 104 may only transmit on channels indicated in the bandwidth indication signaling, channels that are observed as available, and contiguous channels. If there are more than one contiguous 20 MHz bands, the HEW STA 104 may choose do one or more of the following: choose the largest contiguous channels, randomly select contiguous channels, choose the contiguous channels that include the primary channel.

The method 1000 may continue. There is at least one channel to transmit a CTS on, at operation 1010 transmitting CTSs on the determined channels. For example, the HEW STA 104 may determine which channels to transmit at operation 1008 and then transmit on the determined channels at operation 1010. The HEW STA 104 may transmit separate CTS on each channel or may transmit a CTS with a bandwidth of two or more channels. At operation 1008, if there are no channels to transmit a CTS on, then the method 1000 may return to operation 1002. At operation 1010, the method 1000 may return to operation 1002.

Figure 11:
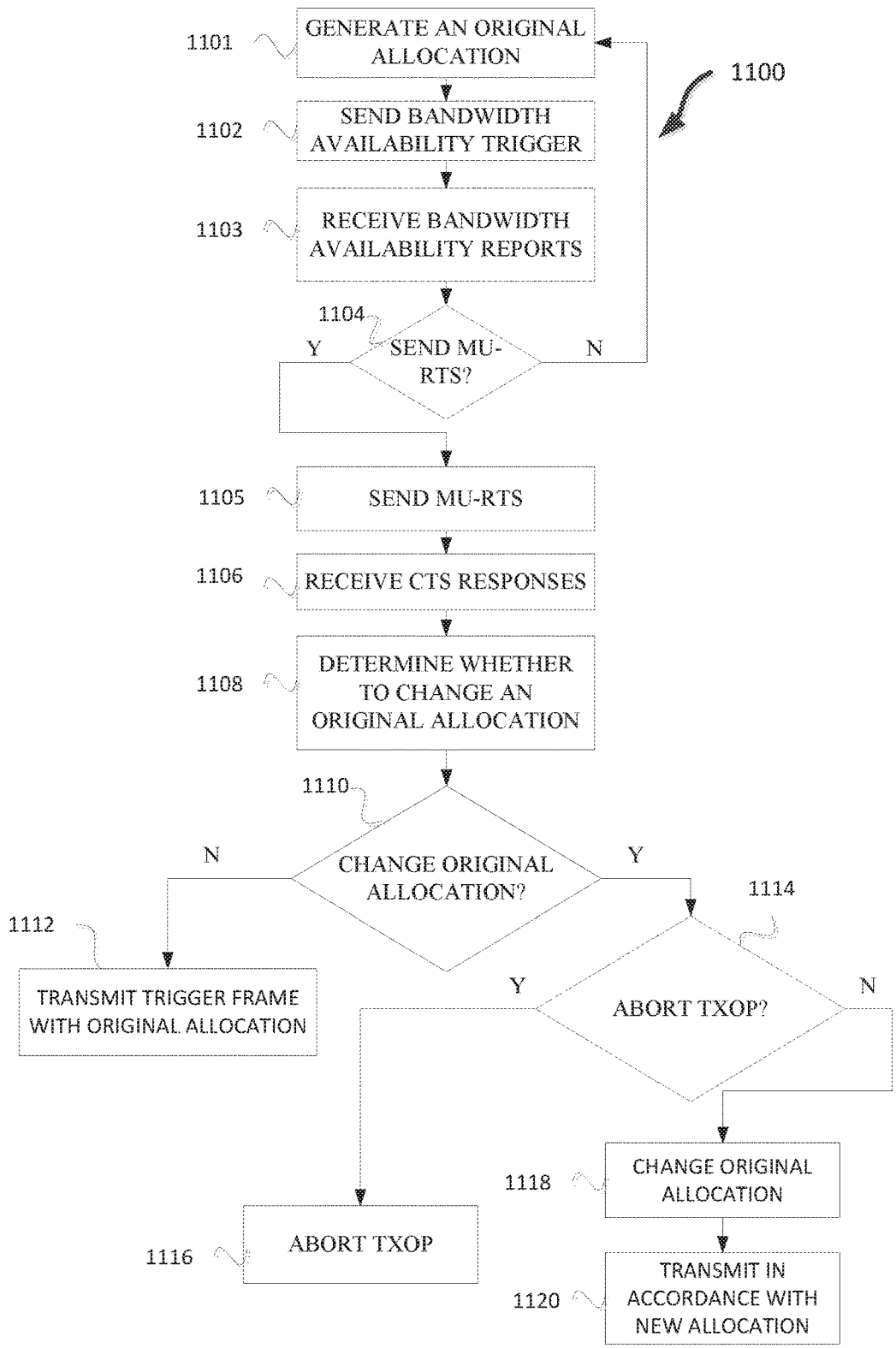
FIG. 11 illustrates a method for sending a trigger frame in accordance with some embodiments.

FIG. 11 illustrates a method for sending a trigger frame in accordance with some embodiments. The method 1100 may begin at operation 1101 with generating an original allocation. For example, a master station 102 may generate an original allocation intended for a transmission opportunity for one or more HEW STAs 104. The transmission opportunity may include an assignment of channels with HEW STAs 104 and a duration of the transmission opportunity.

The method 1100 may optionally continue at operation 1102 with sending a bandwidth availability trigger. For example the master station 102 may transmit a bandwidth availability trigger 1206 as disclosed in conjunction with FIG. 12.

The method 1100 may optionally continue at operation 1103 with receiving bandwidth availability reports. For example, the master station 102 may receive bandwidth availability reports 1208 as disclosed in conjunction with FIG. 12.

The method 1100 may optionally continue at operation 1104 with send MU-RTS? For example, the master station 102 may determine based on not receiving or on the received bandwidth availability reports 1208 not to continue with a transmission opportunity and/or not to send MU-RTSs. The method 1100 may return to operation 1101 or end if the master station 102 determines not to send an MU-RTS.

The method 1100 may continue at operation 1105 with sending MU-RTSs. For example, a master station 102 may send MU-RTSs as disclosed herein. The master station 102 may send the MU-RTS only on a primary channel or may repeat the MU-RTS on multiple channels. The master station 102 may determine which channels and/or which HEW stations 104 to send the MU-RTS for based on the received bandwidth availability reports. For example, the master station 102 may not send a MU-RTS for a channel that is indicated as not available.

The method 1100 may continue at operation 1106 with receiving CTS responses. For example, the master station 102 may receive any CTS responses from the HEW stations 102. The master station 102 may decode CTS responses on each 20 MHz channel. The master station 102 may receive CTS responses on a bandwidth, e.g. 80 MHz, 160 MHz, or 320 MHz.

The method 1110 continues at operation 1108 with determining whether to change the original allocation. For example the master station 102 may determine that there were no CTS responses on the primary channel. The master station 102 could determine to stop the transmission opportunity and send a contention free end (CF-end). The master station 102 could determine to change the allocation on the primary channel and add additional stations on the primary channel. The master station 102 may prepare an additional packet for an additional HEW STA 104 before sending the MU-RTS so that the packet is available to send immediately. The master station 102 could determine to transmit another frame that will fill the duration of the primary channel for the transmission opportunity.

The master station 102 may determine to continue with the original allocation even if there are no CTS responses on the primary channel. In some embodiments, the master station 102 may determine to transmit a CF-end if there are no CTS responses on any of the channels. If the master station 102 receives no CTS responses on the primary channel, but does receive one or more CTS responses on another channel, then the master station 102 may determine to change the original allocation by changing the allocation for the primary channel and optionally other channels where a CTS was not received. The master station 102 may prepare contingency allocations. In some embodiments, the master station 102 may transmit another frame on the primary channel if no CTS is received on the primary channel.

If the master station 102 observes no CTS responses on a given 20 MHz channel, but does receive CTS responses on at least one channel, then the master station 102 may do the following. The master station 102 may change the allocation for any channel where there is not a CTS response. The master station 102 may determine not to transmit on a channel where a CTS response was not received. The master station 102 may determine to transmit on any channel where the master station 102 received a CTS response.

The method 1100 continues at operation 1110 with change original allocation. If the master station 102 determines not to change the original allocation, then the method 1100 continues at operation 1112 with transmit the trigger frame with original allocation.

If the master station 102 determines to change the original allocation then the method 1100 optionally continues at operation 1114 with determining whether to abort the TXOP. For example, if the master station 102 determines to abort the TXOP, then the method 1100 continues at operation 1116 with aborting TXOP. For example, the master station 102 could transmit a CF-end. If at operation 1114, the master station 102 determines not to abort the TXOP, then the method 1100 continues at operation 1118 with changing original allocation. For example, the master station 102 may change the original allocation as described above, or in some embodiments the master station 102 may create a new allocation. In some embodiments the master station 102 may generate an allocation that has contingencies for each channel.

The method 1100 may continue at operation 1120 with transmitting in accordance with new allocation. For example, the master station 102 may change the original allocation and transmit a trigger frame with a new allocation. In some embodiments the original allocation may have been transmitted and the master station 102 may simply transmit with a different allocation than the original allocation with sending a new allocation. The method 1100 may end.

In some embodiments the master station 102 only has SIFS time after receiving the CTS responses to change the original allocation. In some embodiments the master station 102 cannot differentiate the CTS responses from the HEW STAs 104. For example, in some embodiments, the CTS responses do not include a transmitter address. In other example, the CTS responses may interfere with one another.

Figure 12:
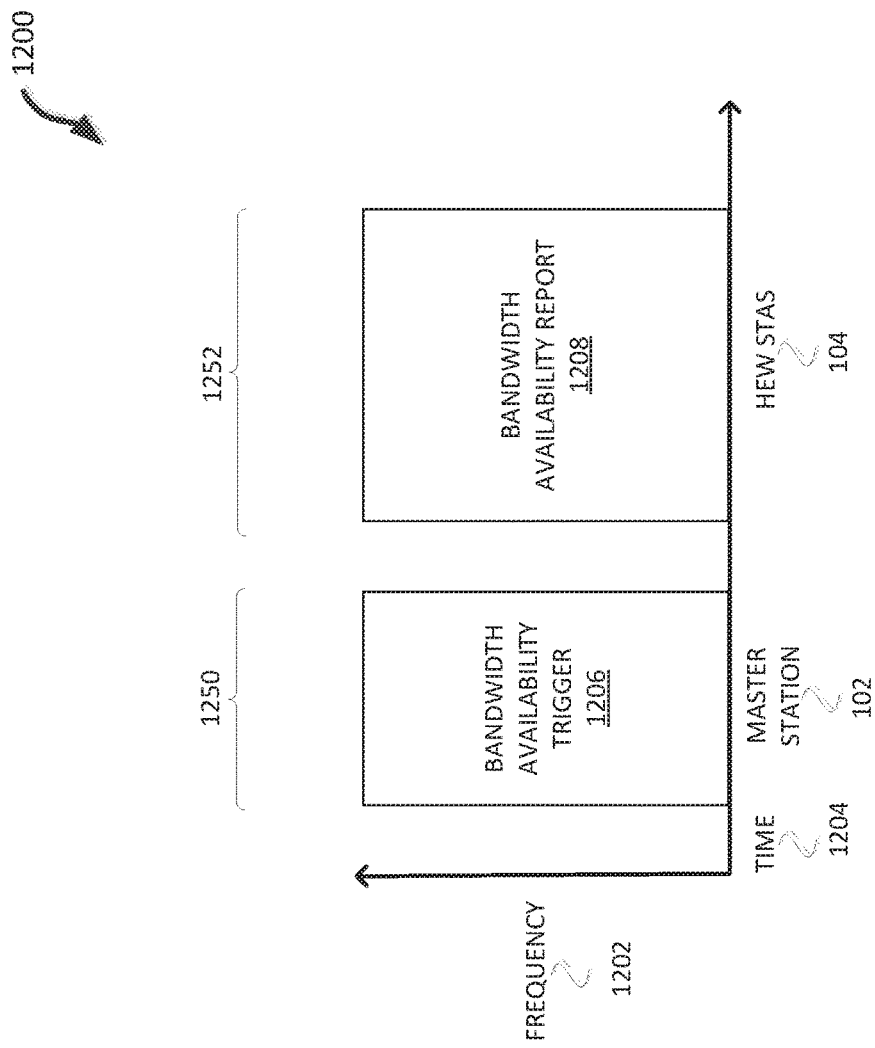
FIG. 12 illustrates a method for a bandwidth availability report in accordance with some embodiments.

FIG. 12 illustrates a method 1200 for a bandwidth availability report in accordance with some embodiments. Illustrated in FIG. 12 is time 1204 along a horizontal axis and frequency 1202 along a vertical axis. The method 1200 may begin at operation 1250 with transmitting a bandwidth availability trigger 1206. For example, the master station 102 may transmit a bandwidth availability trigger 1206 to multiple HEW STAs 104. In some embodiments, HEW STAs 104 and resource allocations for responses are indicated in the bandwidth availability trigger 1206. In some embodiments the bandwidth availability trigger 1206 may be termed a bandwidth poll. The bandwidth availability trigger 1206 may include a total bandwidth indication. The bandwidth availability trigger 1206 may be combined with another packet. The bandwidth availability trigger 1206 may be transmitted on multiple channels. The bandwidth availability trigger 1206 may include an indication of HEW STAs 104 and a resource allocation for the bandwidth availability report 1208. For example, the resource allocation may indicate a channel of 5 MHz for the HEW STA 104 to transmit the bandwidth availability report 1208 on.

The method 1200 may continue at operation 1252 with one or more HEW STAs 104 transmitting a bandwidth availability report 1208. The HEW STAs 104 may transmit the bandwidth availability report according to resource allocations indicated in the bandwidth availability trigger 1206. Bandwidth availability reports 1400 and 1450 are examples of bandwidth availability reports 1208 and are describe in conjunction with FIG. 14. In some embodiments, e.g. as described in conjunction with FIG. 15, the bandwidth availability report 1208 may only include a legacy preamble and high-efficiency (HE) preamble that is transmitted in accordance with a resource allocation in the bandwidth availability trigger 1206. The method 1200 may end.

Figure 13:
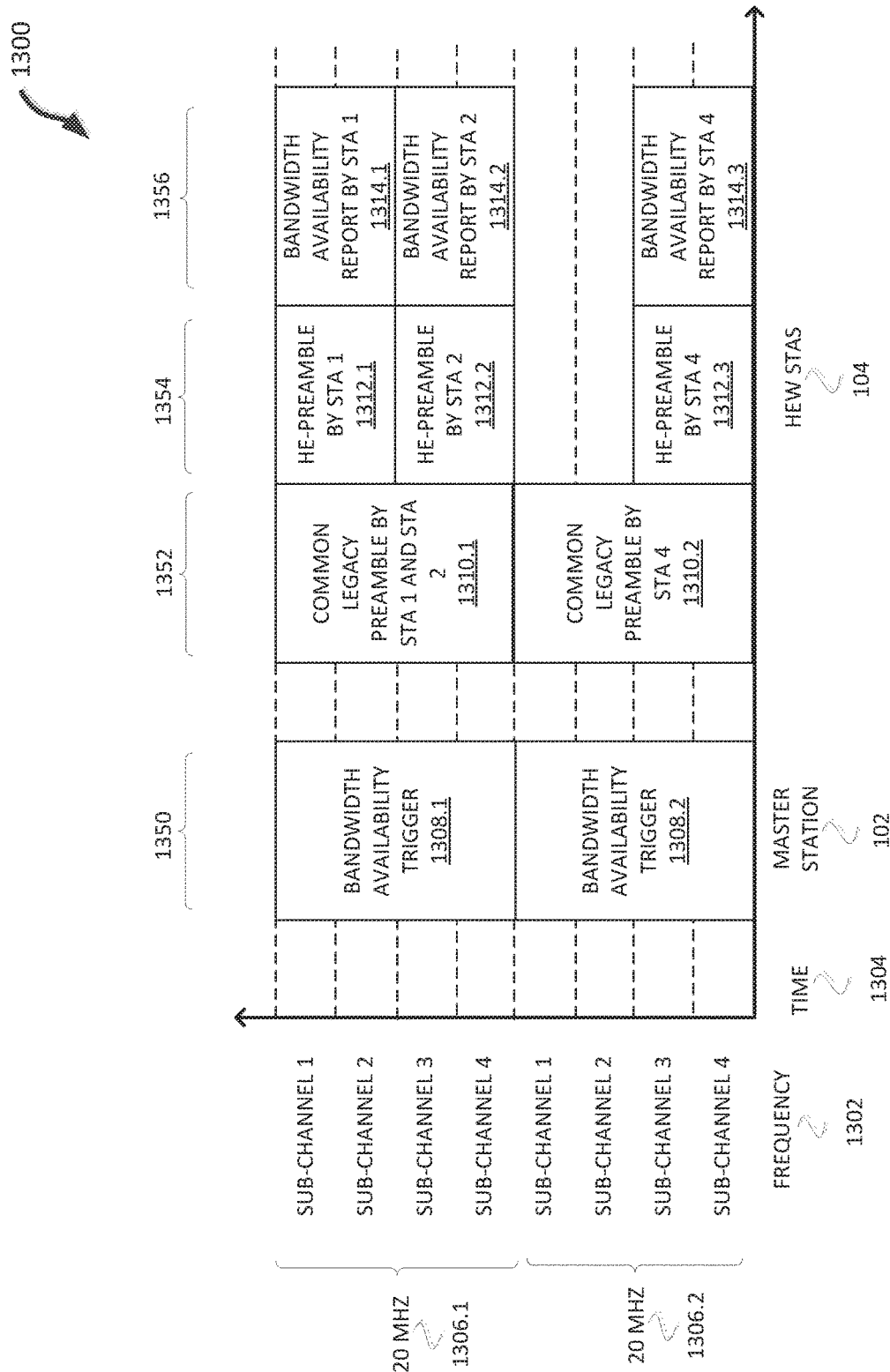
FIG. 13 illustrates a method for a bandwidth availability report in accordance with some embodiments.

FIG. 13 illustrates a method 1300 for a bandwidth availability report in accordance with some embodiments. Illustrated in FIG. 13 is time 1304 along a horizontal axis and frequency 1302 along a vertical axis. There are two 20 MHz channels 1306.1 and 1306.2 illustrates although more or fewer channels may be signaled.

The method 1300 begins at operation 1350 with the master station 102 transmitting bandwidth availability trigger 1308.1 and 1308.2. The bandwidth availability triggers 1308 may include an indication of four HEW STAs 104 as well as a resource allocation which may be a sub-channel for each of the HEW STAs 104 to transmit the bandwidth availability report 1314 on.

The method 1300 continues at operation 1352 with common legacy preamble by STA 1 and STA 2 1310.1 and common legacy preamble by STA 4 1310.2. STA 1, STA 2, STA 3, and STA 4 may be HEW STAs 104. STA 1, STA 2, and STA 4 transmitted a common legacy preamble in accordance with a resource allocation in the bandwidth availability triggers 1308. STA 3 did not response despite being indicated in the bandwidth availability triggers 1308.1 and 1308.2. STA 3 may not have received the bandwidth availability triggers 1308.

Other HEW STAs 104 may have received the bandwidth availability triggers 1308, but may not have responded because they were not indicated in the bandwidth availability triggers 1308.

The method 1300 may continue at operation 1354 with HEW STAs 104 transmitting HE-preamble by STA 1 1312.1, HE-preamble by STA 2, and HE-preamble by STA 4 1310.2. STA 1 may be transmit HE-preamble by STA 1 1312.1 in accordance with a resource allocation in bandwidth availability trigger 1308.1. STA 2 may be transmit HE-preamble by STA 2 1312.2 in accordance with a resource allocation in bandwidth availability trigger 1308.1. STA 4 may be transmit HE-preamble by STA 4 1312.3 in accordance with a resource allocation in bandwidth availability trigger 1308.1.

The method 1300 continues at operation 1356 with HEW STAs 104 transmitting bandwidth availability report by STA 1 1314.1, bandwidth availability report by STA 2 1314.2, and bandwidth availability report by STA 4 1314.3. For example, STA 1 may transmit a bandwidth availability report (e.g., 1400, 1450) in accordance with the resource allocation in bandwidth availability trigger 1308.1. STA 2 may transmit a bandwidth availability report (e.g., 1400, 1450) in accordance with the resource allocation in bandwidth availability trigger 1308.1. STA 4 may transmit a bandwidth availability report (e.g., 1400, 1450) in accordance with the resource allocation in bandwidth availability trigger 1308.1. The method 1300 may end.

Figure 14:
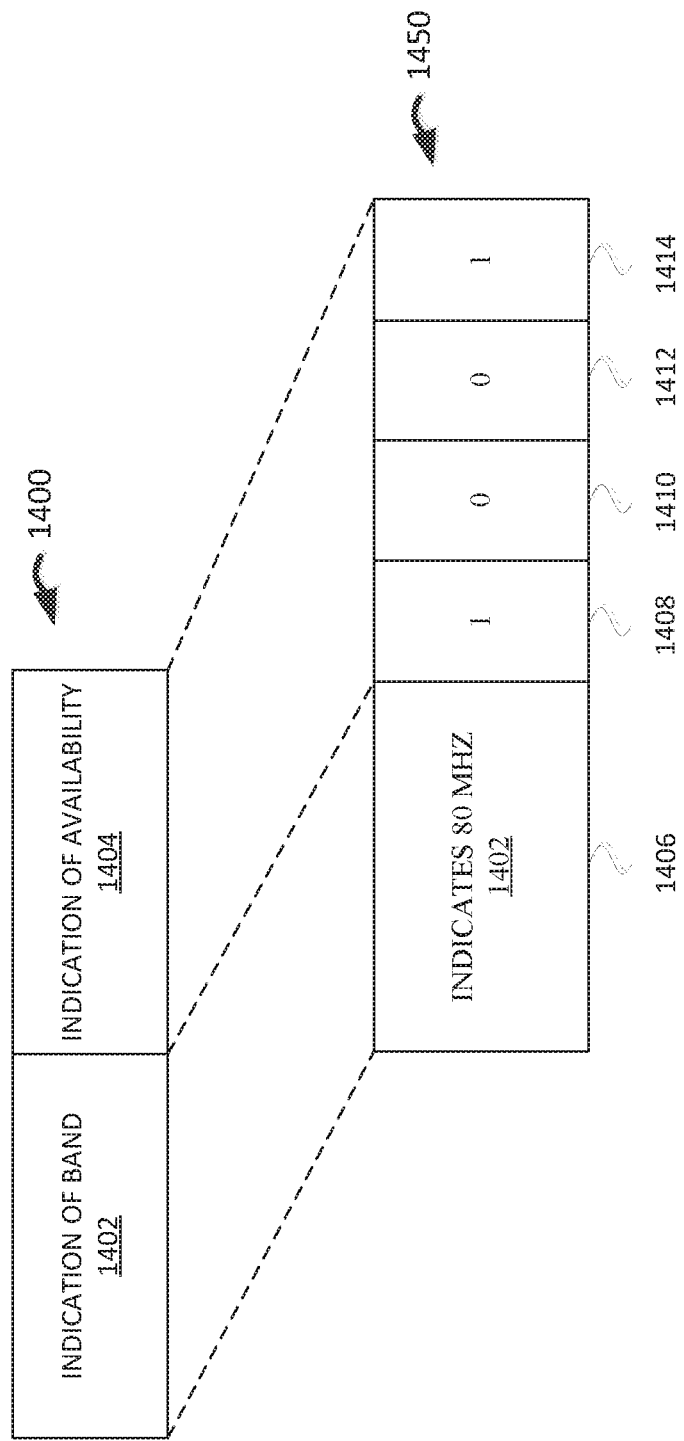
FIG. 14 illustrates examples of a bandwidth availability report in accordance with some embodiments.

FIG. 14 illustrates examples of a bandwidth availability report 1400, 1450 in accordance with some embodiments. The bandwidth availability report 1400 may include an indication of band 1402 and indication of availability 1404. The bandwidth availability report 1450 is another example of a bandwidth availability report. For example, the indication of band 1402 may indicate the report is for 80 MHz. For example, indication of band 1406 indicates an 80 MHz band. In some embodiments the indication of band 1402 may be implied by a communication standard or indicated in a bandwidth availability trigger (e.g., 1206).

The indication of availability 1404 may be a bit map of channel availability. For example, 1408 indicates a 1 that may indicate that the primary channel is available. 1410 may indicate that a secondary 20 MHz channel is not available. 1412 may indicate that an upper 20 MHz in the lower 40 MHz is not available. 1414 may indicate that a lower 20 MHz in the lower 40 MHz is available.

Figure 15:
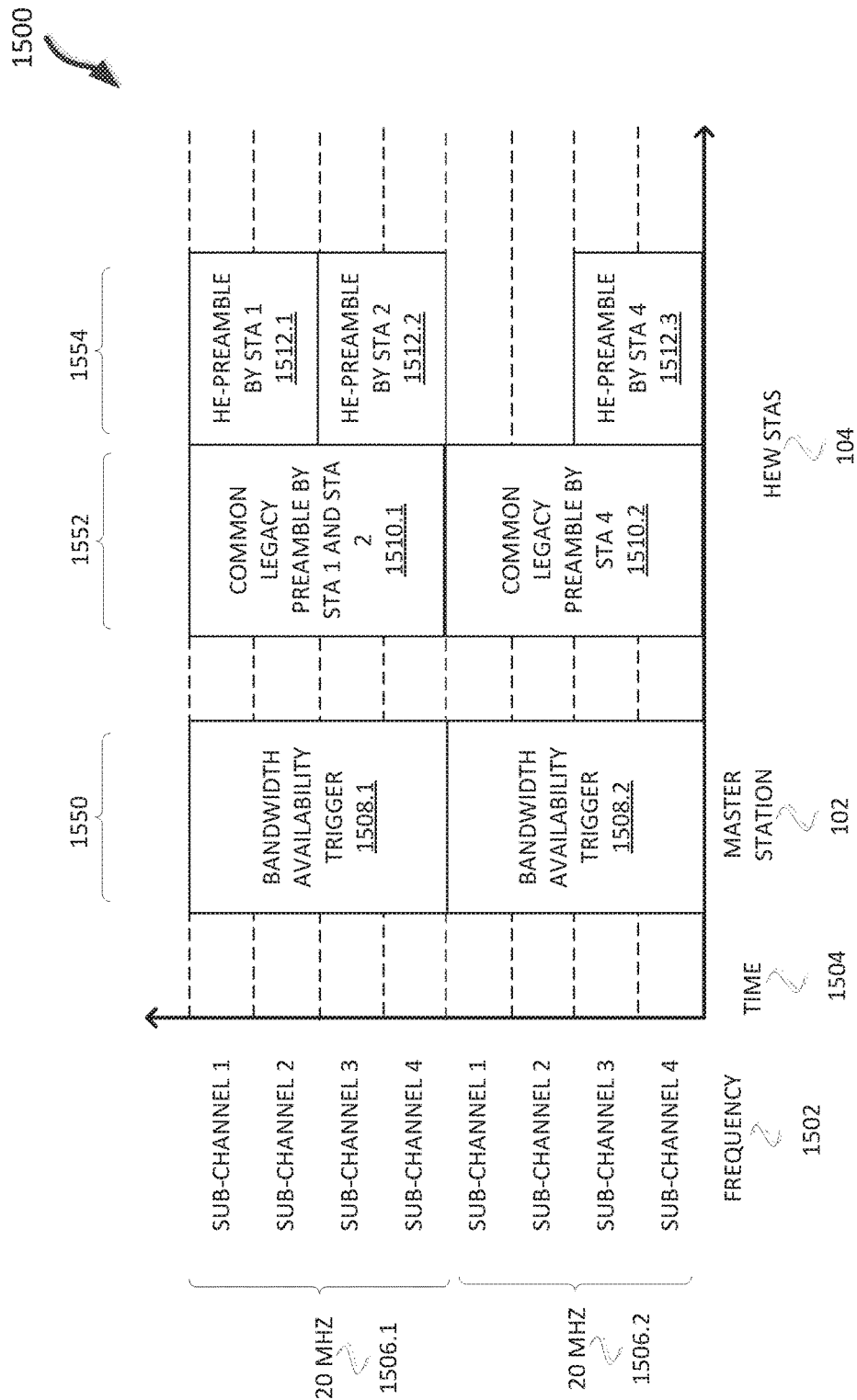
FIG. 15 illustrates a method for a bandwidth availability report in accordance with some embodiments.

FIG. 15 illustrates a method 1500 for a bandwidth availability report in accordance with some embodiments. Illustrated in FIG. 15 is time 1504 along a horizontal axis and frequency 1502 along a vertical axis. There are two 20 MHz channels 1506.1 and 1506.2 illustrates although more or fewer channels may be signaled.

The method 1500 begins at operation 1550 with the master station 102 transmitting bandwidth availability trigger 1508.1 and 1508.2. The bandwidth availability triggers 1508 may include an indication of four HEW STAs 104 (STA 1, STA 2, STA 3, and STA 4) as well as a resource allocation which may be a sub-channel for each of the HEW STAs 104 to transmit the bandwidth availability report 1314 on. The STAs may be HEW STAs 104.

The method 1500 continues at operation 1552 with common legacy preamble by STA 1 and STA 2 1510.1 and common legacy preamble by STA 4 1510.2. STA 1, STA 2, and STA 4 transmitted a common legacy preamble in accordance with a resource allocation in the bandwidth availability triggers 1508. STA 3 did not response despite being indicated in the bandwidth availability triggers 1508.1 and 1508.2. STA 3 may not have received the bandwidth availability triggers 1508.

Other HEW STAs 104 may have received the bandwidth availability triggers 1508, but may not have responded because they were not indicated in the bandwidth availability triggers 1508.

The method 1500 continues at operation 1554 with STA 1, STA 2, and STA 3 transmitting HE-preamble by STA 1 1512.1, HE-preamble by STA 2, and HE-preamble by STA 4 1512.3, respectively. The master station 102 may interpret the HE-preamble being transmitted in accordance with the resource allocation indicated in bandwidth availability triggers 1508 as an indication that the channels are available. STA 3 not transmitting a HE-preamble on sub-channel 1 and sub-channel 2 of 20 MHz 1506.2 may indicate that STA 3 did not receive the bandwidth availability triggers 1508 or that the channels indicated in the bandwidth availability trigger 1508 for STA 3 are not available. The master station 102 may interpret the responses form the STAs and determine resource allocations based on the responses. The method 1500 may end.

Figure 16:
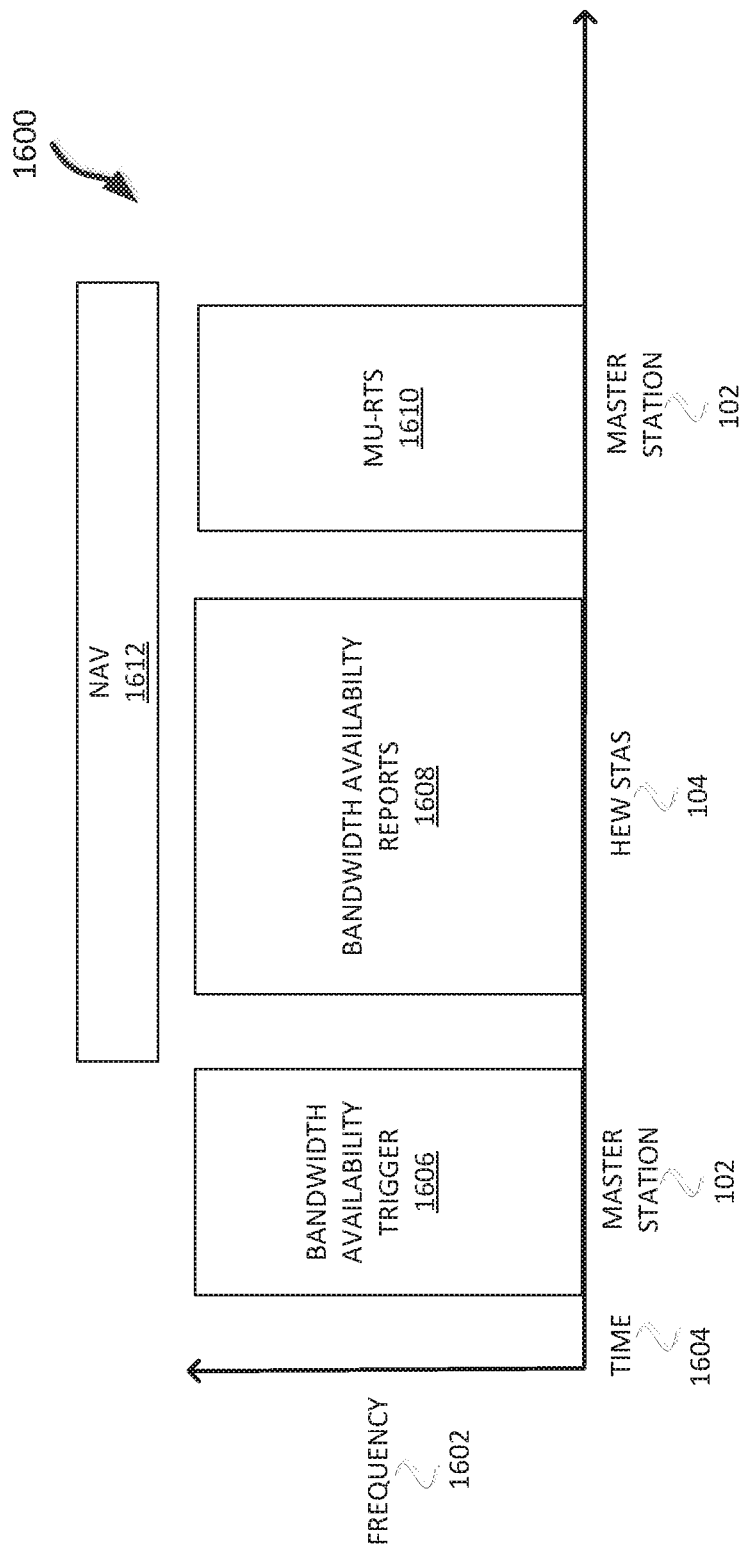
FIG. 16 illustrates a bandwidth availability report in accordance with some embodiments.

FIG. 16 illustrates a bandwidth availability report 1608 in accordance with some embodiments. Illustrated in FIG. 16 is time 1604 along a horizontal axis and frequency 1602 along a vertical axis. The master station 102 may transmit a bandwidth availability trigger 1606 as disclosed herein. The master station 102 may set NAV 1612 to extend past the bandwidth availability reports 1608 and have a duration that lasts to or past a MU-RTS 1610.

Figure 17:
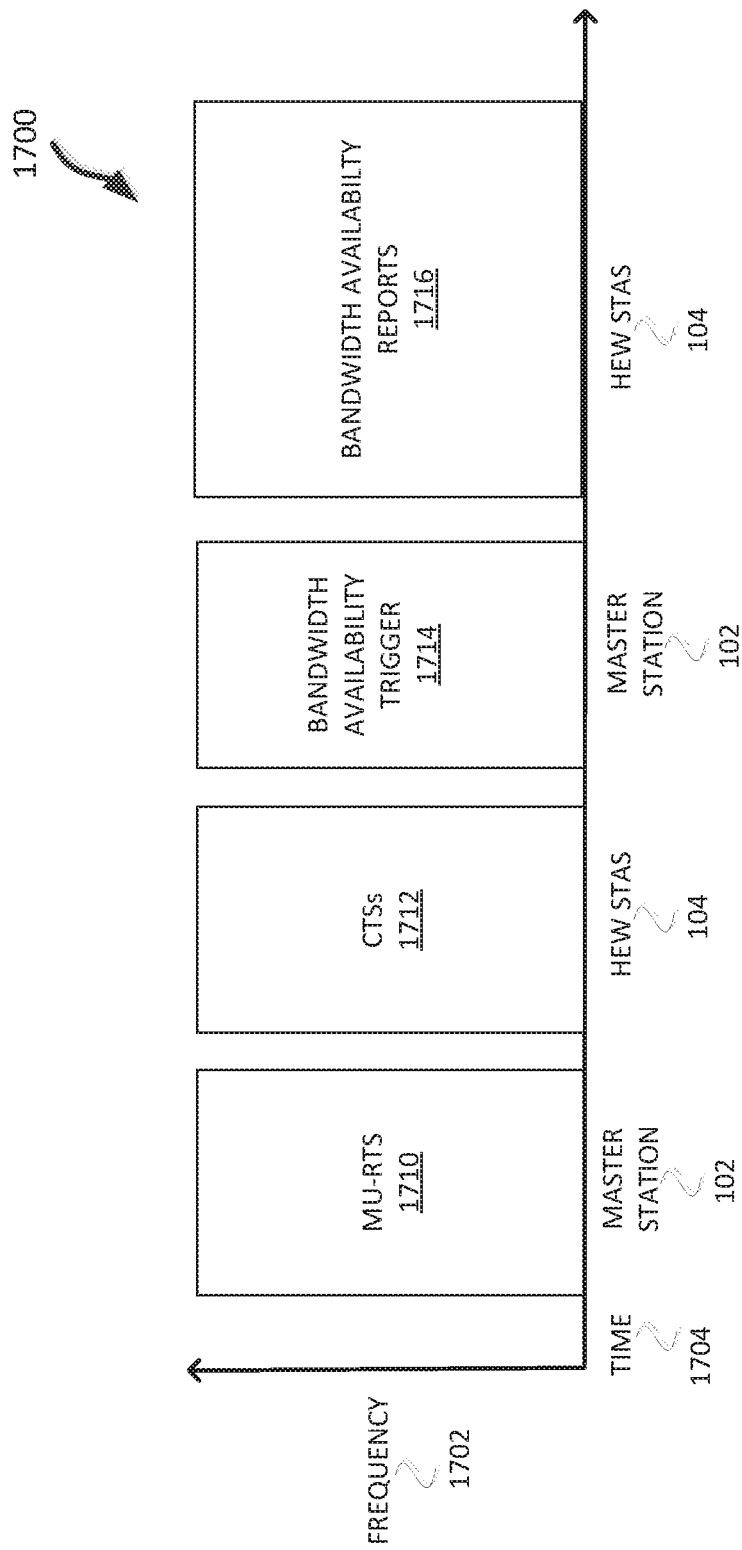
FIG. 17 illustrates that the bandwidth availability trigger may be transmitted after the MU-RTS in accordance with some embodiments.

FIG. 17 illustrates that the bandwidth availability trigger 1714 may be transmitted after the MU-RTS 1710 in accordance with some embodiments. The master station 102 may transmit a MU-RTS 1710 to one or more HEW STAs 104. One or more HEW STAs 104 may responds with CTSs 1712. The master station 102 may then transmit the bandwidth availability trigger 1714. The HEW STAs 104 may then respond with bandwidth availability reports 1716. In alternative embodiments, the bandwidth availability trigger 1714 may be transmitted before the MU-RTS 1710.

Figure 18:
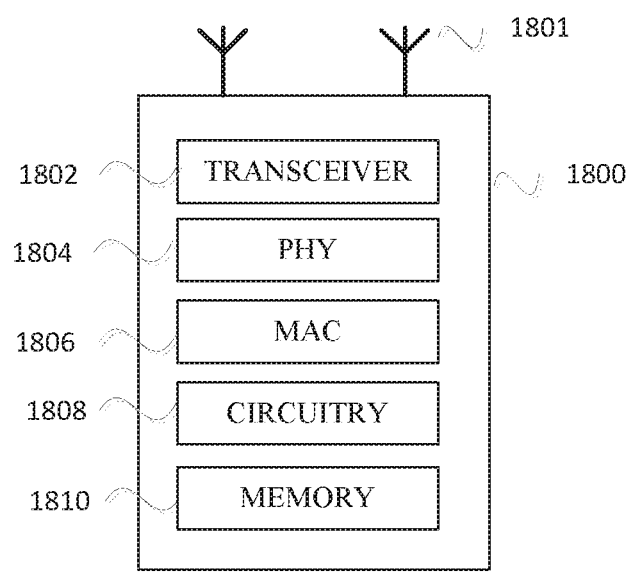
FIG. 18 illustrates a HEW station in accordance with some embodiments.

FIG. 18 illustrates a HEW station 1800 in accordance with some embodiments. HEW station 1800 may be a HEW compliant device that may be arranged to communicate with one or more other HEW stations, such as HEW stations 104 (FIG. 1) or master station 102 (FIG. 1) as well as communicate with legacy devices 106 (FIG. 1). The HEW station 1800 may be a master station 102 or access point. HEW stations 104 and legacy devices 106 may also be referred to as HEW devices and legacy stations (STAs), respectively. HEW station 1800 may be suitable for operating as access point 102 (FIG. 1) or an HEW station 104 (FIG. 1). In accordance with embodiments, HEW station 1800 may include, among other things, a transmit/receive element 1801 (for example an antenna), a transceiver 1802, physical layer (PHY) circuitry 1804, and medium-access control layer circuitry (MAC) 1806. PHY 1804 and MAC 1806 may be HEW compliant layers and may also be compliant with one or more legacy IEEE 802.11 standards.

MAC 1806 may be arranged to configure physical protocol data units (PPDUs) and arranged to transmit and receive PPDUs, among other things. HEW station 1800 may also include other circuitry 1808 and memory 1810 configured to perform the various operations described herein. The circuitry 1808 may be coupled to the transceiver 1802, which may be coupled to the transmit/receive element 1801. While FIG. 18 depicts the circuitry 1808 and the transceiver 1802 as separate components, the circuitry 1808 and the transceiver 1802 may be integrated together in an electronic package or chip.

In some embodiments, the MAC 1806 may be arranged to contend for a wireless medium during a contention period to receive control of the medium for the HEW control period and configure an HEW PPDU. In some embodiments, the MAC 1806 may be arranged to contend for the wireless medium based on channel contention settings, a transmitting power level, and a clear channel assessment (CCA) level.

The PHY 1804 may be arranged to transmit the HEW PPDU. The PHY 1804 may include circuitry for modulation/demodulation, upconversion/downconversion, filtering, amplification, etc. In some embodiments, the circuitry 1808 may include one or more processors. The circuitry 1808 may be configured to perform functions based on instructions being stored in a RAM or ROM, or based on special purpose circuitry.

In some embodiments, the circuitry 1808 may be configured to perform one or more of the functions described herein in conjunction with FIGS. 1-18 and disclosed herein.

In some embodiments, two or more antennas 1801 may be coupled to the PHY 1804 and arranged for sending and receiving signals including transmission of the HEW packets. The HEW station 1800 may include a transceiver 1802 to transmit and receive data such as HEW PPDU and packets that include an indication that the HEW station 1800 should adapt the channel contention settings according to settings included in the packet. The memory 1810 may store information for configuring the other circuitry to perform operations for configuring and transmitting HEW packets and performing the various operations described herein in conjunction with FIGS. 1-18.

In some embodiments, the HEW station 1800 may be configured to communicate using OFDM communication signals over a multicarrier communication channel. In some embodiments, HEW station 1800 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect as they may also be suitable to transmit and/or receive communications in accordance with other techniques and standards. In some embodiments, the HEW station 1800 may use 4× symbol duration of 802.11n or 802.11ac.

In some embodiments, an HEW station 1800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point 102, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas 1801, a graphics processor, an application processor, speakers, and other mobile device elements. The display may be an LCD screen including a touch screen.

The antennas 1801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1801 may be effectively separated to take advantage of spatial diversity and the different channel characteristics that may result.

Although the device 1800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1800 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency wireless local-area network (HEW) master station. The apparatus including processing circuitry configured to generate a packet to indicate a multi-user request-to-send (MU-RTS) and to indicate one or more channels on which one or more HEW stations are to transmit a clear-to-send (CTS). And the apparatus including a transceiver configured to transmit the packet to the one or more HEW stations, and receive CTS responses to the packet on the one or more channels.

In Example 2, the subject matter of Example 1 can optionally include where the processing circuitry is further configured to generate the packet to indicate one or more channels on which one or more HEW stations are to transmit a CTS and for each of the one or more channels an indication of which of the one or more HEW stations are to transmit the CTS.

In Example 3, the subject matter of Examples 1 or 2 can optionally include where the processing circuitry is further configured to generate an allocation for the one or more channels to be used for a transmission opportunity based on the clear-to-send responses.

In Example 4, the subject matter of any of Examples 1-3 can optionally include where the processing circuitry is further configured to determine to abort a transmission opportunity based on the CTS responses, and the transceiver is configured to transmit a contention free end (CF-end) packet.

In Example 5, the subject matter of any of Examples 1-4 can optionally include where the channels are one from the following group: a 20 MHz bandwidth, a 5 MHz bandwidth, a 10 MHz bandwidth, a 2.5 MHz bandwidth, a 40 MHz bandwidth, an 80 MHz bandwidth, a 160 MHz bandwidth, and a 320 MHz bandwidth.

In Example 6, the subject matter of any of Examples 1-5 can optionally include where the transceiver is further configured to transmit a bandwidth availability trigger to the one or more HEW stations, and receive bandwidth availability reports in response to the bandwidth availability trigger from the one or more HEW stations, where the bandwidth availability reports indicate channel available from one or more of the one or more HEW stations for one or more of the one or more channels.

In Example 7, the subject matter of Example 6 can optionally include where the processing circuitry is further configured to determine an allocation for a transmission opportunity based on the bandwidth availability reports; and transmit a second packet comprising the allocation.

In Example 8, the subject matter of Example 6 can optionally include where the bandwidth availability trigger comprises an indication of a channel and an indication of one or more of the one or more HEW stations.

In Example 9, the subject matter of Example 6 can optionally include where the processing circuitry is further configure to generate the packet to indicate a MU-RTS and to indicate one or more channels on which one or more HEW stations are to transmit a CTS, where the one or more channels and one or more HEW stations are selected by the master station based on the bandwidth availability reports.

In Example 10, the subject matter of Example 6 can optionally include where the bandwidth availability trigger further comprises a resource allocation that indicates a channel on which the one or more HEW stations are to transmit the bandwidth available reports.

In Example 11, the subject matter of any of Examples 1-10 can optionally include where the CTS responses are received in accordance with at least one from the following group: orthogonal frequency division multiple access (OFDMA) multiple-user multiple-input multiple-output (MU-MIMO), and orthogonal frequency division multiplexing (OFDM).

In Example 12, the subject matter of any of Examples 1-11 can optionally include memory coupled to the processing circuitry.

In Example 13, the subject matter of Example 12 can optionally include one or more antennas coupled to the circuitry.

Example 14 is a method performed by a high-efficiency wireless local-area network (HEW) master station. The method may include generating a packet to indicate a multi-user request-to-send (MU-RTS) and to indicate one or more channels on which one or more HEW stations are to transmit a clear-to-send (CTS), transmitting the packet to the one or more HEW stations. The method may also include receiving CTS responses to the packet on the one or more channels.

In Example 15, the subject matter of Example 14 can optionally include generating the packet to indicate one or more channels on which one or more HEW stations are to transmit a CTS and for each of the one or more channels an indication of which of the one or more HEW stations are to transmit the CTS.

In Example 16, the subject matter of Example 14 or 15 can optionally include generating an allocation for the one or more channels to be used for a transmission opportunity based on the CTS responses, and transmitting a second packet with the allocation for the one or more channels.

In Example 17, the subject matter of any of Examples 14-16 can optionally include where the channels are one from the following group: a 20 MHz bandwidth, a 5 MHz bandwidth, a 10 MHz bandwidth, a 2.5 MHz bandwidth, a 40 MHz bandwidth, an 80 MHz bandwidth, a 160 MHz bandwidth, and a 320 MHz bandwidth.

In Example 18, the subject matter of any of Examples 14-17 can optionally include transmitting a bandwidth availability trigger to the one or more HEW stations, and receiving bandwidth availability reports in response to the bandwidth availability trigger from the one or more HEW stations, where the bandwidth availability reports indicate channel available from one or more of the one or more HEW stations for one or more of the one or more channels.

Example 19 is an apparatus of a high-efficiency wireless local-area network (HEW) station, the apparatus including circuitry configured to receive a packet that indicates a multi-user request-to-send and that indicates one or more channels on which the HEW station is to transmit a clear-to-send (CTS), and determine whether to send the CTS on the one or more channels based on at least one of the follow conditions: if a medium busy condition for the channel of the one or more channels indicates the channel is not busy, a network allocation vector indicates the channel is not busy, and whether a primary channel of an operating channel is occupied. The circuitry may be further configured to transmit the CTS on at least one channel of the one or more channels, if it is determined to send the CTS on the at least one channel of the one or more channels.

In Example 20, the subject matter of Example 19 can optionally include where the circuitry is configured to transmit the CTS on at least one channel in accordance with a minimum bandwidth of 20 MHz.

In Example 21, the subject matter of Example 19 or 20 can optionally include where the circuitry is further configured to receive a bandwidth availability trigger from a master station, and transmit to the master station a bandwidth availability report that indicates available of one or more of the one or more channels.

In Example 22, the subject matter of any of Examples 19-21 can optionally include where the CTS is transmitted in accordance with at least one from the following group: orthogonal frequency division multiple access (OFDMA), multiple-user multiple-input multiple-output (MU-MIMO), and orthogonal frequency division multiplexing (OFDM).

In Example 23, the subject matter of any of Examples 19-22 can optionally include memory coupled to the circuitry; and, one or more antennas coupled to the circuitry.

In Example 24 is a non-transitory computer-readable storage medium that stores instructions for execution by one or more processors, the instructions to configure the one or more processors to cause a high-efficiency wireless local-area network (HEW) master station to: generate a packet to indicate a multi-user request-to-send (MU-RTS) and to indicate one or more channels on which one or more HEW stations are to transmit a clear-to-send (CTS); transmit the packet to the one or more HEW stations, and receive clear-to-send responses to the packet on the one or more channels.

In Example 25, the subject matter of Example 24 can optionally include where the instructions are to further configure the one or more processors to cause the HEW master station to: generate the packet to indicate one or more channels on which one or more HEW stations are to transmit a CTS and for each of the one or more channels an indication of which of the one or more HEW stations are to transmit the CTS.

Example 26 is an apparatus of a high-efficiency wireless local-area network (HEW) master station. The apparatus including means for generating a packet to indicate a multi-user request-to-send (MU-RTS) and to indicate one or more channels on which one or more HEW stations are to transmit a clear-to-send (CTS); and means for transmitting the packet to the one or more HEW stations. The apparatus may include means for receiving CTS responses to the packet on the one or more channels.

In Example 27, the subject matter of Example 26 can optionally include means for generating the packet to indicate one or more channels on which one or more HEW stations are to transmit a CTS and for each of the one or more channels an indication of which of the one or more HEW stations are to transmit the CTS.

In Example 28, the subject matter of any of Examples 26 or 27 can optionally include means for generating an allocation for the one or more channels to be used for a transmission opportunity based on the clear-to-send responses.

In Example 29, the subject matter of any of Examples 26-28 can optionally include means for aborting a transmission opportunity based on the CTS responses; and the transceiver is configured to transmit a contention free end (CF-end) packet.

In Example 30, the subject matter of any of Examples 26-29 can optionally include where the channels are one from the following group: a 20 MHz bandwidth, a 5 MHz bandwidth, a 10 MHz bandwidth, a 2.5 MHz bandwidth, a 40 MHz bandwidth, an 80 MHz bandwidth, a 160 MHz bandwidth, and a 320 MHz bandwidth.

In Example 31, the subject matter of any of Examples 26-30 can optionally include means for transmitting a bandwidth availability trigger to the one or more HEW stations; and means for receiving bandwidth availability reports in response to the bandwidth availability trigger from the one or more HEW stations, wherein the bandwidth availability reports indicate channel available from one or more of the one or more HEW stations for one or more of the one or more channels.

In Example 32, the subject matter of any of Examples 26-31 can optionally include means for determining an allocation for a transmission opportunity based on the bandwidth availability reports; and transmit a second packet comprising the allocation.

In Example 33, the subject matter of any of Examples 19-21 can optionally include where the bandwidth availability trigger comprises an indication of a channel and an indication of one or more of the one or more HEW stations.

In Example 34, the subject matter of Example 26 can optionally include means for generating the packet to indicate a MU-RTS and to indicate one or more channels on which one or more HEW stations are to transmit a CTS, wherein the one or more channels and one or more HEW stations are selected by the master station based on the bandwidth availability reports.

In Example 35, the subject matter of Example 26 can optionally include where the bandwidth availability trigger further comprises a resource allocation that indicates a channel on which the one or more HEW stations are to transmit the bandwidth available reports.

In Example 36, the subject matter of any of Examples 26-35 can optionally include where the CTS responses are received in accordance with at least one from the following group: orthogonal frequency division multiple access (OFDMA) multiple-user multiple-input multiple-output (MU-MIMO), and orthogonal frequency division multiplexing (OFDM).

In Example 37, the subject matter of any of Examples 26-36 can optionally include memory coupled to the processing circuitry.

In Example 38, the subject matter of Example 37 can optionally include one or more antennas coupled to the circuitry.

Example 39 is an apparatus of a high-efficiency wireless local-area network (HEW) station. The apparatus including means for receiving a packet that indicates a multi-user request-to-send and that indicates one or more channels on which the HEW station is to transmit a clear-to-send (CTS), and means for determining whether to send the CTS on the one or more channels based on at least one of the follow conditions: if a medium busy condition for the channel of the one or more channels indicates the channel is not busy, a network allocation vector indicates the channel is not busy, and whether a primary channel of an operating channel is occupied. The apparatus may include means for transmitting the CTS on at least one channel of the one or more channels, if it is determined to send the CTS on the at least one channel of the one or more channels.

In Example 40 the subject matter of Example 39 may optionally include means for transmitting the CTS on at least one channel in accordance with a minimum bandwidth of 20 MHz.

In Example 41, the subject matter of Examples 38 or 39 can optionally include means for receiving a bandwidth availability trigger from a master station; and means for transmitting to the master station a bandwidth availability report that indicates available of one or more of the one or more channels.

In Example 42, the subject matter of any of Examples 39-41 can optionally include where the CTS is transmitted in accordance with at least one from the following group: orthogonal frequency division multiple access (OFDMA), multiple-user multiple-input multiple-output (MU-MIMO), and orthogonal frequency division multiplexing (OFDM).

In Example 43, the subject matter of any of Examples 39-42 can optionally include memory coupled to the circuitry; and, one or more antennas coupled to the circuitry.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA), the apparatus comprising: memory; and processing circuitry coupled to the memory, the processing circuitry configured to:

decode a trigger frame (TF) from an access point, the TF comprising an uplink (UL) resource allocation for the HE STA to transmit a bandwidth query report (BQR) to the access point, wherein the TF comprises an indication that the TF is of type bandwidth query report poll (BQRP);

in response to the TF, determine whether each 20 MHz subchannel of a plurality of 20 MHz subchannels is busy, and set a corresponding bit of the BQR to indicate whether a corresponding 20 MHz subchannel is busy;

generate signaling to configure the HE STA to transmit the BQR to the access point in accordance with the UL resource allocation.

2. The apparatus of claim 1, wherein determine whether each 20 MHz subchannel of the plurality of 20 MHz subchannels is busy further comprises:

determine the corresponding 20 MHz subchannel is busy if a clear channel assessment (CCA) of the corresponding 20 MHz subchannel indicates a value above a threshold level.

3. The apparatus of claim 1, wherein the UL resource allocation comprises a subchannel allocation, the subchannel allocation less than 20 MHz.

4. The apparatus of claim 3, wherein generate signaling to configure the HE STA to transmit the BQR to the access point in accordance with the UL resource allocation further comprises:

generate signaling to configure the HE STA to transmit to the access point a legacy preamble with a 20 MHz bandwidth and the BQR with a bandwidth in accordance with the subchannel allocation.

5. The apparatus of claim 1, wherein the processing circuitry is further configured to:

before the decode the trigger frame, encode a frame for the access point, the frame comprising a bandwidth field, wherein the BQR comprises one bit for each 20 MHz subchannel of a bandwidth indicated by the bandwidth field.

6. The apparatus of claim 5, wherein the bandwidth is 80 MHz and the plurality of 20 MHz subchannels is four 20 MHz subchannels.

7. The apparatus of claim 1, wherein the UL resource allocation is one of a plurality of UL resource allocations for a plurality of HE stations to transmit BQRs to the access point.

8. The apparatus of claim 1, wherein the UL resource allocation further comprises a subchannel allocation and an indication of the HE STA.

9. The apparatus of claim 1, wherein generate signaling to configure the HE STA to transmit the BQR to the access point in accordance with the UL resource allocation further comprises:

generate signaling to configure the HE STA to transmit the BQR to the access point in accordance with the UL resource allocation and in accordance with one or both of orthogonal frequency division multiple access (OFDMA) and multiple-user multiple-input multiple-output (MU-MIMO).

10. The apparatus of claim 1, wherein the UL resource allocation comprises a subchannel allocation, and wherein generate signaling to configure the HE STA to transmit the BQR to the access point in accordance with the UL resource allocation further comprises:

generate signaling to configure the HE STA to transmit to the access point a legacy preamble with a 20 MHz bandwidth and the BQR with a bandwidth in accordance with the subchannel allocation, and wherein the subchannel allocation is within the 20 MHz bandwidth.

11. The apparatus of claim 1, wherein determine whether each 20 MHz subchannel of the plurality of 20 MHz subchannels is busy further comprises:
- determine the corresponding 20 MHz subchannel is busy if a value of a clear channel assessment (CCA) of the corresponding 20 MHz subchannel indicates the corresponding 20 MHz subchannel is busy or a network allocation vector of the HE STA indicates the corresponding 20 MHz subchannel is busy.

12. The apparatus of claim 1, wherein the HE STA and the access point are each one from the following group: an Institute of Electrical and Electronic Engineers (IEEE) 802.11ax access point, an IEEE 802.11ax station, an IEEE 802.11 station, and an IEEE 802.11 access point.

13. The apparatus of claim 1, further comprising transceiver circuitry coupled to the processing circuitry.

14. The apparatus of claim 13, further comprising one or more antennas coupled to the transceiver circuitry.

15. A non-transitory computer-readable storage medium that stores instructions for execution by one or more processors of an apparatus of a high-efficiency (HE) station (STA), the instructions to configure the one or more processors to:
- decode a trigger frame (TF) from an access point, the TF comprising an uplink (UL) resource allocation for the HE STA to transmit a bandwidth query report (BQR) to the access point, wherein the TF comprises an indication that the TF is of type bandwidth query report poll (BQRP);
- in response to the TF, determine whether each 20 MHz subchannel of a plurality of 20 MHz subchannels is busy, and set a corresponding bit of the BQR to indicate whether a corresponding 20 MHz subchannel is busy;
- generate signaling to configure the HE STA to transmit the BQR to the access point in accordance with the UL resource allocation.

16. The non-transitory computer-readable storage medium of claim 15, wherein determine whether each 20 MHz subchannel of the plurality of 20 MHz subchannels is busy further comprises:
- determine the corresponding 20 MHz subchannel is busy if a value of a clear channel assessment (CCA) of the corresponding 20 MHz subchannel indicates the corresponding 20 MHz subchannel is busy.

17. The non-transitory computer-readable storage medium of claim 15, wherein the UL resource allocation comprises a subchannel allocation, the subchannel allocation less than 20 MHz, and wherein generate signaling to configure the HE STA to transmit the BQR to the access point in accordance with the UL resource allocation further comprises:
- generate signaling to configure the HE STA to transmit to the access point a legacy preamble with a 20 MHz bandwidth and the BQR with a bandwidth in accordance with the subchannel allocation.

18. A method performed by an apparatus of a 6 GHz high-efficiency (HE) station (STA), the method comprising:
- decoding a trigger frame (TF) from an access point, the TF comprising an uplink (UL) resource allocation for the HE STA to transmit a bandwidth query report (BQR) to the access point, wherein the TF comprises an indication that the TF is of type bandwidth query report poll (BQRP);
- in response to the TF, determining whether each 20 MHz subchannel of a plurality of 20 MHz subchannels is busy, and set a corresponding bit of the BQR to one indicate whether a corresponding 20 MHz subchannel is busy;
- generating signaling to configure the HE STA to transmit the BQR to the access point in accordance with the UL resource allocation.

19. The method of claim 18, wherein determining whether each 20 MHz subchannel of the plurality of 20 MHz subchannels is busy further comprises:
- determine the corresponding 20 MHz subchannel is busy if a value of a clear channel assessment (CCA) of the corresponding 20 MHz subchannel indicates the corresponding 20 MHz subchannel is busy.

20. An apparatus of a high-efficiency (HE) access point (AP), the apparatus comprising: memory; and processing circuitry coupled to the memory, the processing circuitry configured to:
- encode a trigger frame (TF), the TF comprising a plurality of uplink (UL) resource allocations for a plurality of HE stations (STAs) to transmit a bandwidth query report (BQR) to the HE AP, wherein the TF comprises an indication that the TF is of type bandwidth query report poll (BQRP);
- generate signaling to configure the HE AP to transmit the TF to the plurality of HE STAs; and
- decode a plurality of BQRs from the plurality of HE STAs in accordance with the plurality of UL resource allocations.

21. The apparatus of claim 20, wherein each of the plurality of UL resource allocations comprises a corresponding subchannel allocation.

22. The apparatus of claim 21, wherein decode a plurality of BQRs from the plurality of HE STAs in accordance with the plurality of UL resource allocations further comprises:
- decode the plurality of BQRs from the plurality of HE STAs in accordance with the plurality of UL resource allocations, wherein each BQR of the plurality of BQRs comprises a legacy preamble with a 20 MHz bandwidth and the BQR with a bandwidth in accordance with the corresponding subchannel allocation.

23. The apparatus of claim 20, wherein the processing circuitry is further configured to:
- before the encode the trigger frame, decode a frame from each of the plurality of HE STAs, the frame comprising a corresponding bandwidth field, wherein the plurality of BQRs each comprise one bit for each 20 MHz subchannel of a bandwidth indicated by the corresponding bandwidth field.

24. The apparatus of claim 20, further comprising transceiver circuitry coupled to the processing circuitry.

25. The apparatus of claim 24, further comprising one or more antennas coupled to the transceiver circuitry.

* * * * *